(12) United States Patent
Akiyama et al.

(10) Patent No.: US 6,930,458 B2
(45) Date of Patent: Aug. 16, 2005

(54) APPARATUS FOR CONTROLLING DECELERATION OF DC MOTOR

(75) Inventors: Shigeki Akiyama, Ichinomiya (JP); Masatoshi Kokubo, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 302 days.

(21) Appl. No.: 10/320,374

(22) Filed: Dec. 17, 2002

(65) Prior Publication Data

US 2003/0151380 A1 Aug. 14, 2003

(30) Foreign Application Priority Data

Dec. 20, 2001 (JP) .......................... 2001-387761

(51) Int. Cl.[7] .............................. H02P 3/14; H02P 3/18
(52) U.S. Cl. .................. 318/376; 318/375; 318/373; 318/757; 318/763; 318/432; 318/434
(58) Field of Search ................ 318/375–381, 318/261–280, 286, 258, 273, 757, 763, 256, 432–434

(56) References Cited

U.S. PATENT DOCUMENTS

| | | | | |
|---|---|---|---|---|
| 4,518,902 A | * | 5/1985 | Melocik et al. | 318/373 |
| 4,529,919 A | * | 7/1985 | Melocik et al. | 318/373 |
| 4,628,232 A | * | 12/1986 | Saganovsky et al. | 318/284 |
| 6,175,204 B1 | * | 1/2001 | Calamatas | 318/375 |

FOREIGN PATENT DOCUMENTS

| | | | | |
|---|---|---|---|---|
| JP | 61-154405 | * | 7/1986 | B60L/15/28 |
| JP | A 4-17594 | | 1/1992 | |
| JP | 04-017594 | * | 1/1992 | H02P/7/29 |
| JP | 2003-189651 | * | 12/2004 | H02P/3/10 |

* cited by examiner

Primary Examiner—Marlon T. Fletcher
Assistant Examiner—Tyrone Smith
(74) Attorney, Agent, or Firm—Oliff & Berridge, PLC

(57) ABSTRACT

An apparatus for controlling deceleration of a DC motor which is driven in a forward operating direction with a forward-drive electric current applied thereto by a forward driving device, wherein the forward motor driving device applies the forward-drive electric current in the form of pulses to the DC motor during its deceleration, and wherein a plugging-braking device operable while the motor is subjected to a regenerative brake or operated in a non-braked state is operated to apply a reverse-drive electric current in the form of pulses to the motor, to apply a plugging brake to the motor, such that at least one pulse of the reverse-drive electric current follows every predetermined number of pulses of the forward-drive electric current. The plugging-braking device may be replaced by a dynamic braking device operable to short-circuit the motor to apply a dynamic brake to the motor, with at least one pulse of a dynamic-brake current following every predetermined number of pulses of the forward-drive electric current.

34 Claims, 18 Drawing Sheets

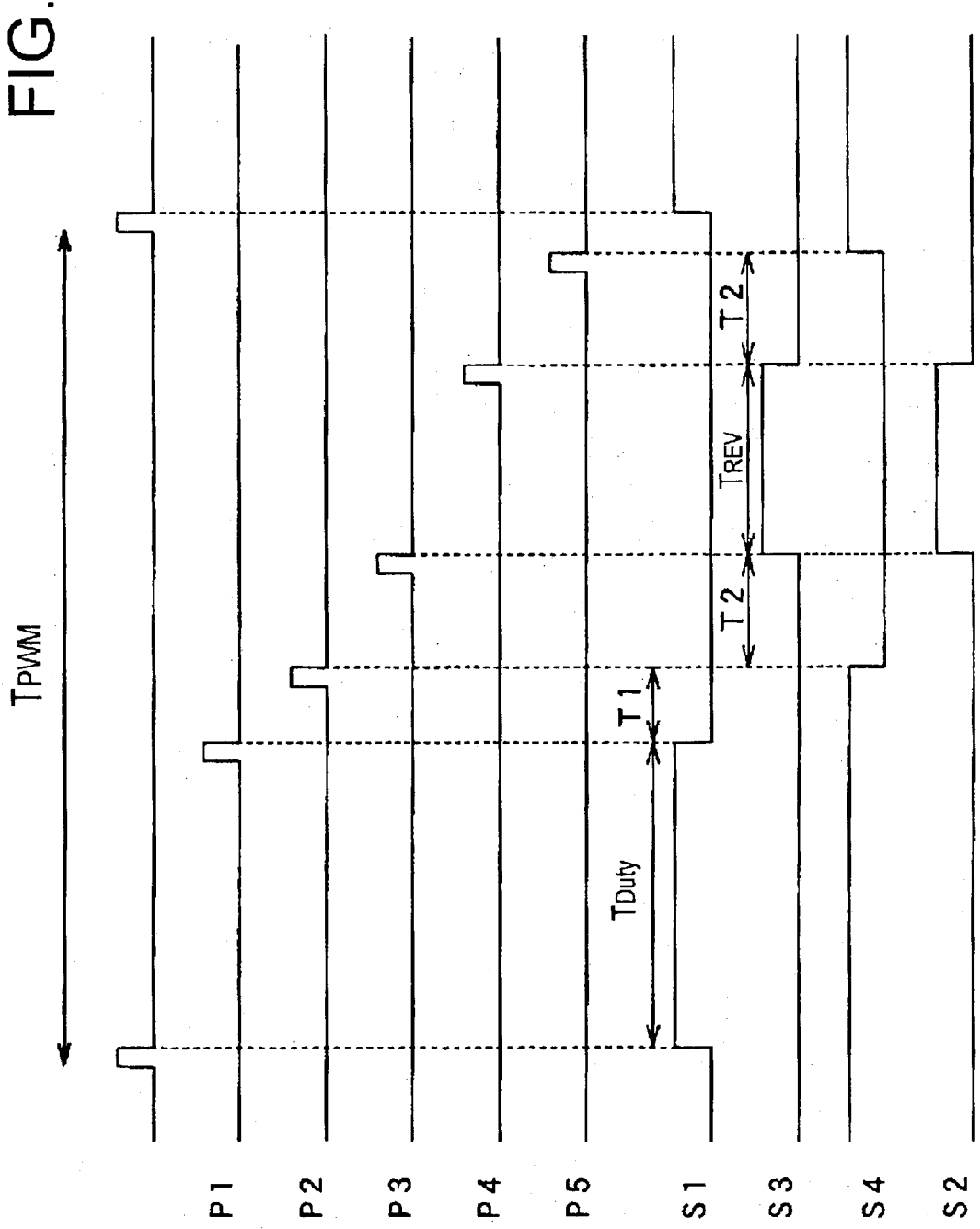

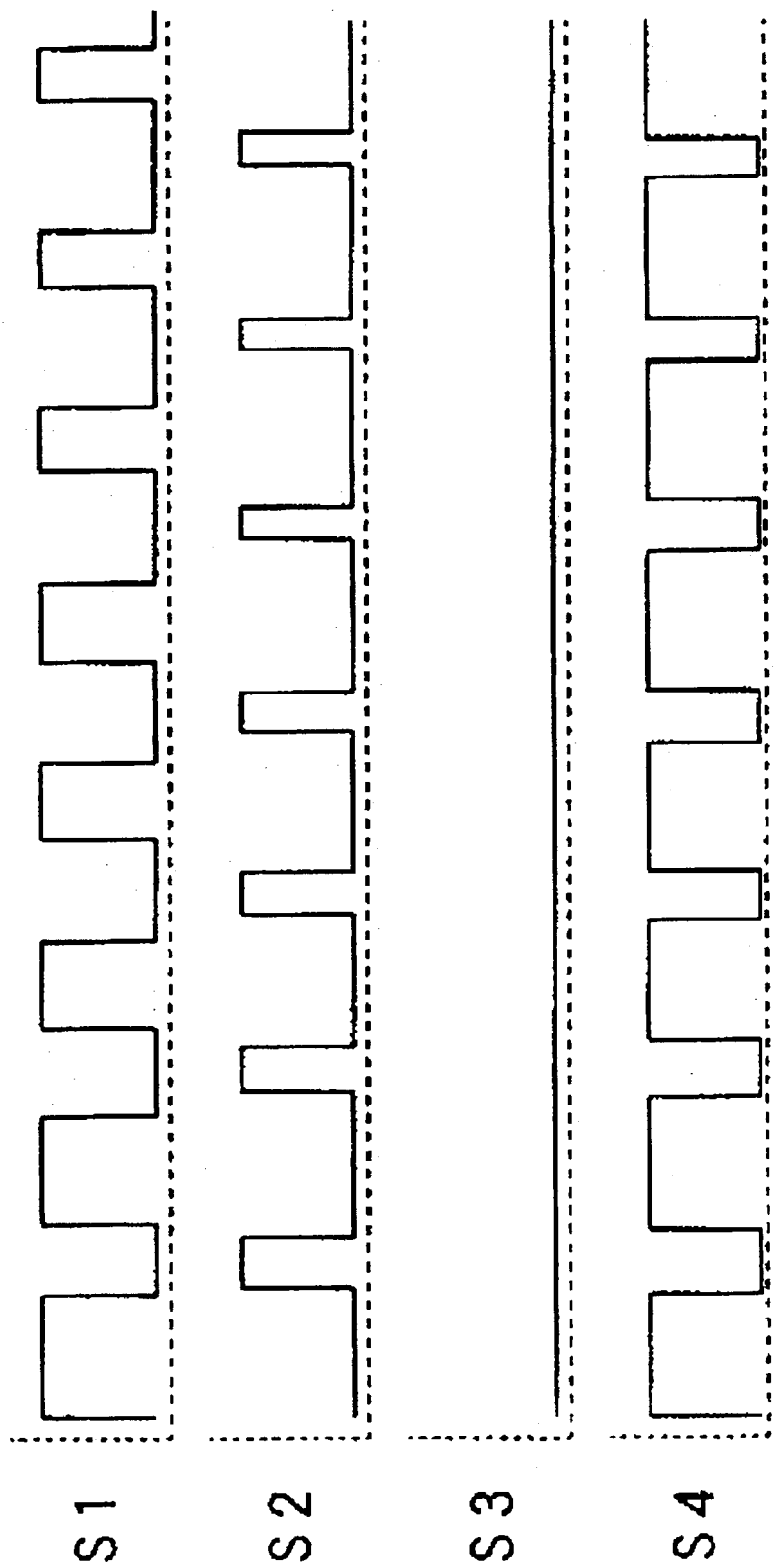

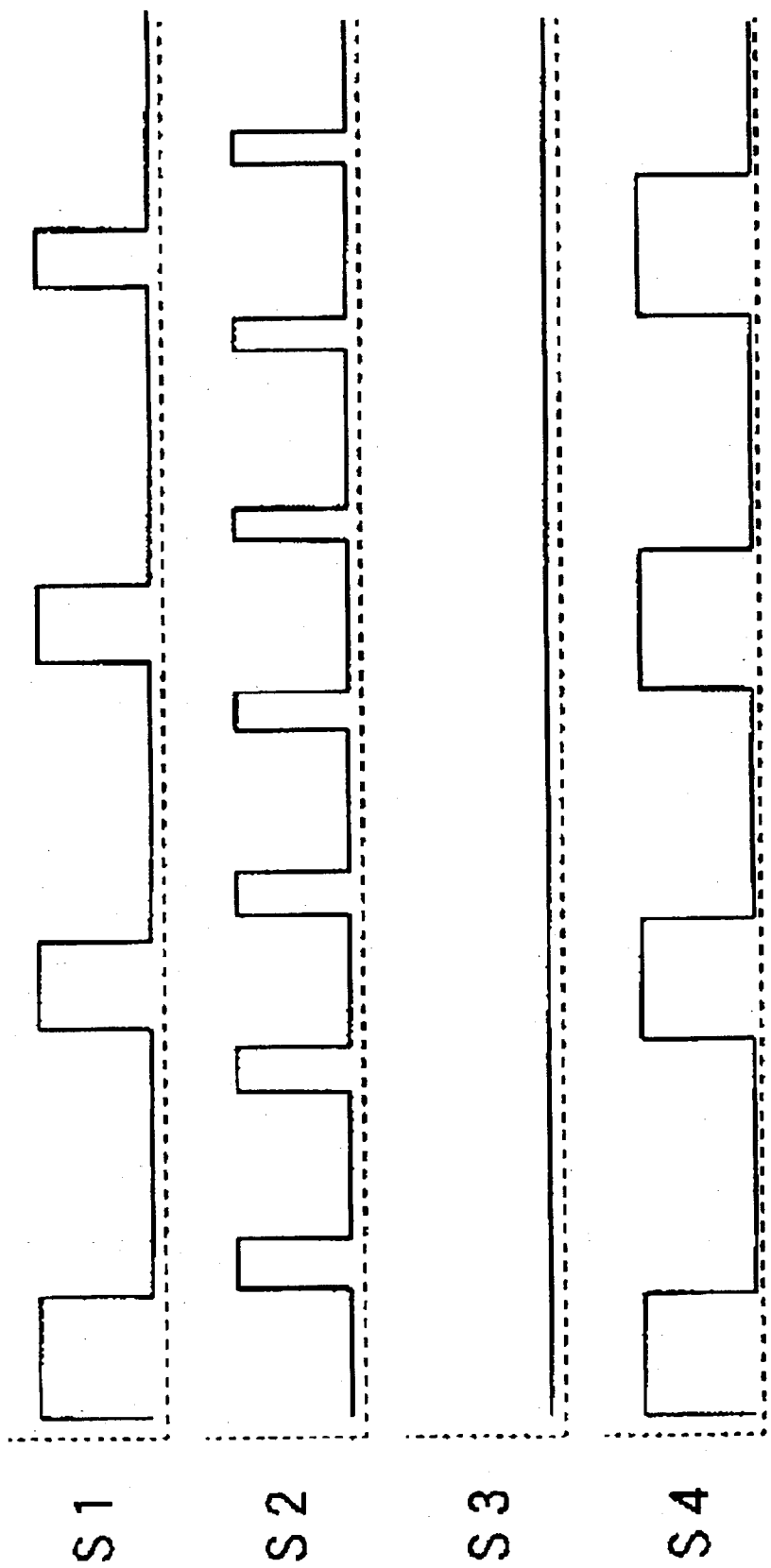

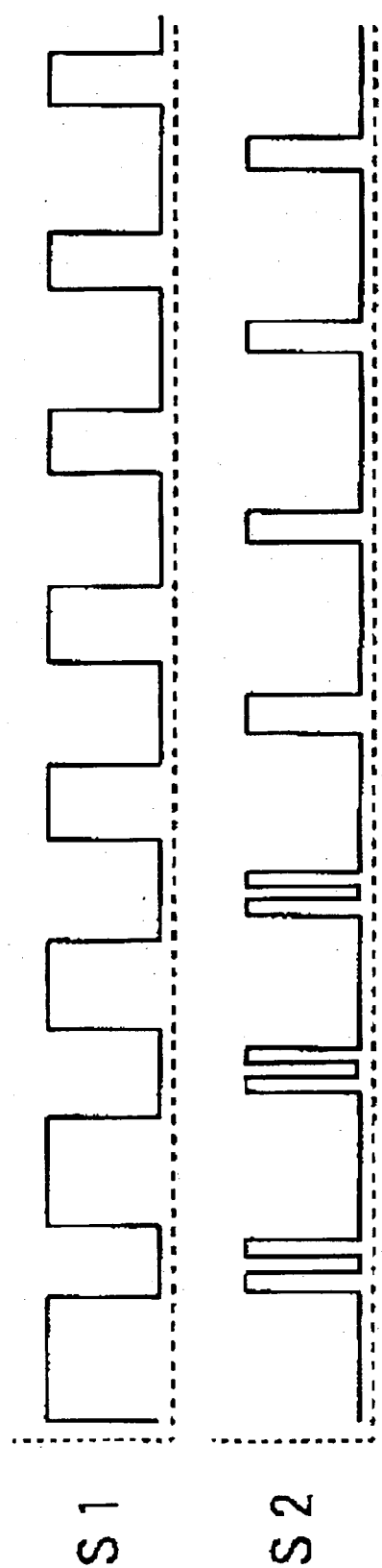

APPARATUS FOR CONTROLLING DECELERATION OF DC MOTOR

The present application is based on Japanese Patent Application No. 2001-387761 filed Dec. 20, 2001, the content of which is incorporated herein by reference.

BACKGROUND OF THE INVENTION

1. Field of the Invention

The present invention relates in general to an apparatus for controlling deceleration of a DC motor, and more particularly to a DC-motor deceleration control apparatus arranged to apply a drive current in the form of pulses to the DC motor.

2. Discussion of Related Art

A conventional control apparatus used to drive and control a DC motor by PWM control employs a so-called "bridge circuit" which is arranged to apply an electric current to the DC motor in opposite directions (forward and reverse directions). This bridge circuit will be described in detail by reference to FIG. 1, which shows an arrangement of a driver device used to drive a carriage drive DC motor 18 (hereinafter referred to simply as "CR motor 18") which is provided to move a carriage of a printer through an endless belt.

As shown in FIG. 1, the motor driver device includes a first pair of switching elements S1 and S2 disposed in series with each other between positive and negative poles Pv, P0 of an electric power source, and a second pair of switching elements S3 and S4 also disposed in series with each other between the two poles Pv, P0. The first and second pairs of switching elements S1, S2, S3, S4 are connected in parallel to each other. To each of the switching elements S1–S4, there is connected a flywheel diode FD in parallel. The switching elements S1–S4 may be PNP type or NPN type transistors with the flywheel diodes FD connected thereto. However, the switching elements may be field-effect transistors (FET) which incorporate parasitic diodes equivalent in function to the flywheel diodes. In this case, exclusive flywheel diodes are not provided externally of the field-effect transistors.

One of the two terminals of the CR motor 18 is connected between the two switching elements S1 and S2 while the other terminal is connected between the other two switching elements S3, S4. When the switching elements S1 and S4 are turned on while the switching elements S2 and S3 are turned off, an electric current (forward-drive electric current) is applied to the CR motor 18 in a forward-drive direction so that the CR motor 18 is operated in the forward direction. When the switching elements S2 and S3 are turned on while the switching elements S1 and S4 are turned off, on the other hand, an electric current (reverse-drive electric current) is applied to the CR motor 18 in a reverse-drive direction so that the CR motor 18 is operated in the reverse direction.

The CR motor 18 can be operated at a constant speed or smoothly decelerated, in the forward direction, for example, by controlling an average amount of electric current applied to the CR motor 18 by alternately turning on and off the switching elements with pulse signals. To this end, the switching elements S1–S4 are connected to a control portion through a CR-motor driver circuit 31, so that the switching elements are turned on and off under the control of the control portion, to move the carriage at a desired speed or stop the carriage at a desired position.

To stop the carriage, for example, the duty ratio (ON time ratio) of the switching element Si is gradually reduced while the switching element S4 is kept on, as indicated in FIG. 13A. In this case, the electric current in the form of a pulse signal is applied to the CR motor 18, and the duty ratio of the pulse signal is gradually reduced, so that the CR motor 18 can be smoothly stopped at a desired position. When the switching element S1 is in the off state while the switching element S4 is in the on state, the electric current flows in the reverse-drive direction from the negative pole P0 to the positive pole Pv through the switching element S4 and the flywheel diode FD of the switching element S1, so that the CR motor 18 is subjected to a so-called "regenerative brake".

A regenerative braking force generated by the regenerative brake is relatively large while the CR motor 18 is operating at a relatively high speed, and the regenerative braking force decreases with a decrease in the operating speed of the CR motor 18. Where the duty ratio of the switching element S1 is gradually reduced as described above, a relatively long time is required until the CR motor 18 is brought to a complete stop, and the required stopping distance of the carriage is relatively long, as indicated in FIG. 14A.

In view of the above, it is considered to positively apply an electric current in the form of pulses to the CR motor 18 in the reverse-drive direction during a selected portion of the deceleration period of the CR motor 18 with the switching elements S1 and S4 controlled as described above, by controlling the duty ratio (ON time ratio) of the switching element S3 while the switching element S2 is held on, as indicated in FIG. 13B.

When the electric current is applied to the CR motor 18 in the reverse-drive direction with the switching elements S2 and S3 being controlled as described above, the operating speed of the CR motor 18 is abruptly or rapidly reduced, as indicated in FIG. 14B. Accordingly, the application of the electric current in the reverse-drive direction during the selected portion of the deceleration period as indicated in FIG. 13B makes it difficult to exactly control the position at which the carriage is stopped.

SUMMARY OF THE INVENTION

It is therefore an object of the present invention to provide a DC-motor deceleration control apparatus which permits smooth deceleration of a DC motor in a relatively short time. This object may be achieved according to any one of the following modes of the present invention in the form of a DC-motor deceleration control apparatus, each of which is numbered like the appended claims and depends from the other mode or modes, where appropriate, for easier understanding of technical features disclosed in the present application and possible combinations of those features. However, it is to be understood that the invention is not limited to those technical features or combinations thereof, and that any one of a plurality of technical features described below with respect to any one mode of the invention may be a subject matter of the present invention, without the other technical feature or features being combined with that one technical feature.

(1) An apparatus for controlling deceleration of a DC motor which is driven in a forward operating direction with a forward-drive electric current applied thereto by forward motor driving means, wherein the forward motor driving means applies the forward-drive electric current in the form of pulses to the DC motor during deceleration of the DC motor, the apparatus comprising:

plugging-braking means operable while the DC motor is subjected to a regenerative brake or operated in a non-braked state, for applying a reverse-drive electric current in the form of pulses to the DC motor, to apply a plugging brake to the DC motor, such that at least one pulse of the reverse-drive electric current follows every predetermined number of pulses of the forward-drive electric current, and such that the reverse-drive electric current flows in a direction corresponding to a reverse operating direction of the DC motor which is opposite to the forward operating direction.

In the DC-motor deceleration control apparatus constructed according to the above mode (1) of this invention, the forward motor driving means is operated to apply a forward-drive electric current in the form of pulses to the DC motor during its deceleration, and the reverse braking means is operated while the DC motor is subjected to a regenerative brake or operated in a non-braked state, to apply a reverse-drive electric current in the form of pulses to the DC motor, to apply a plugging brake to the DC motor, such that at least one pulse of the reverse-drive electric current follows every predetermined number of pulses of the forward-drive electric current, and such that the reverse-drive electric current flows in a direction corresponding to a reverse operating direction opposite to the forward operating direction. Thus, the present DC-motor deceleration control apparatus is arranged to apply the forward-drive electric current to the DC motor for smooth deceleration, as well as to apply the reverse-drive electric current to the DC motor for applying a plugging brake to the DC motor so as to shorten the required deceleration time. Accordingly, the DC motor can be stopped at a desired or nominal position with high positioning accuracy. The term "plugging" used herein is interpreted to mean braking of an electric motor by reversing its connections, so that the electric motor tends to turn in the opposite or reverse direction.

(2) An apparatus according to the above mode (1), wherein the at least one pulse of the reverse-drive electric current follows every pulse of the forward-drive electric current (3) An apparatus according to the above mode (1) or (2), wherein the at least one pulse of the reverse-drive electric current follows every predetermined two or more, number of pulses of the forward-drive electric current, for instance, every two pulses of the forward-drive electric current.

(4) An apparatus according to any one of the above modes (1)–(3), wherein the at least one pulse of the reverse-drive electric current consists of one pulse of the reverse-drive electric current, which follows every, pulse of the forward-drive electric current, for example.

(5) An apparatus according to any one of the above modes (1)–(4), wherein the at least one pulse of the reverse-drive electric current consists of at least two pulses of the reverse-drive electric current, which follow every pulse of the forward-drive electric current, for example.

(6) An apparatus according to any one of the above modes (1)–(5), wherein the at least one pulse of the reverse-drive electric current consists of at least two pulses of the reverse-drive electric current which follow every predetermined two or more number of pulses of the forward-drive electric current, for example every two pulses of the forward-drive electric current.

(7) An apparatus according to any one of the above modes (1)–(6), wherein the predetermined number of pulses of the forward-drive electric current is changed in at least two steps during the deceleration of the DC motor. For example, at least one pulse of the reverse-drive electric current follows every pulse of the forward-drive electric current in an initial portion of the deceleration period of the DC motor, and every two pulses of the forward-drive electric current in the subsequent portion of the deceleration period.

(8) An apparatus according to any one of the above modes (1)–(7), wherein the number of the at least one pulse of the reverse-drive electric current is changed in at least two steps during the deceleration of the DC motor. For instance, two pulses of the reverse-drive electric current follow every pulse of the forward-drive electric current in the initial portion of the deceleration period, but only one pulse of the reverse-drive electric current follows every pulse of the forward-drive electric current in the subsequent portion of the deceleration period.

(9) An apparatus according to any one of the above modes (1)–(8), further comprising a period timer operable to detect a predetermined constant time interval at which application of the forward-drive electric current to the DC motor is initiated.

The DC motor can be suitably decelerated even with the application of the forward-drive electric current at the predetermined constant interval, owing to the application of the reverse-drive electric current during interruption of the application of the forward-drive electric current. The application of the forward-drive electric current at the constant time interval simplifies control processing to decelerate the DC motor, and the hardware arrangement for the control processing. Accordingly, the DC-motor deceleration control apparatus according to the above mode (9) has an advantage of simplified control and hardware arrangement for controlling the deceleration of the DC motor, and an accordingly reduced cost of manufacture of the apparatus, in addition to the advantage discussed above with respect to the above mode (1).

(10) An apparatus according to any one of the above modes (1)–(9), wherein a pulse width of the reverse-drive electric current has a predetermined proportional relationship with that of the forward-drive electric current.

In the DC-motor deceleration control apparatus according to the above mode (10), the pulse width of the reverse-drive electric current has the predetermined proportional relationship with that of the forward-drive electric current, so that the stop position of the DC motor can be easily controlled. For instance, the pulse width of the reverse-drive electric current is made smaller than that of the forward-drive electric current such that a ratio of these two pulse widths is held constant at a suitable value. In this case, it is possible to prevent an actual operation of the DC motor in the reverse operating direction and an abrupt change in the operating speed of the DC motor, and assure highly accurate control of the stop position of the DC motor, without having to monitoring an amount of the electric current flowing through the DC motor. Thus, the apparatus according to the above mode (10) is advantageous for its improved control accuracy of the stop position of the DC motor.

(11) An apparatus according to the above mode (10), further comprising pulse-width reducing means for gradually reducing a pulse width of the forward-drive electric current.

(12) An apparatus according to any one of the above modes (1)–(11), wherein the plugging-braking means is operated to initiate application of the reverse-drive electric current to the DC motor a first time after a moment of initiation of application of the regenerative brake to the DC motor, and to terminate the application of the reverse-drive electric current a second time before a moment of termination of the application of the regenerative brake.

If the reverse-drive electric current is applied to the DC motor immediately after the initiation of application the regenerative brake to the DC motor, there may arise a sudden change in the operating speed of the DC motor. Further, the stop position of the DC motor can be controlled with higher accuracy, when the reverse-drive electric current is not applied up to a moment immediately before the termination of application of the regenerative brake. In the DC-motor deceleration control apparatus according to the above mode (12) wherein the reverse-drive electric current is not applied to the DC motor immediately after the initiation and before the termination of application of the regenerative brake, the accuracy of control of the stop position of the DC motor can be significantly improved.

(13) An apparatus according to any one of the above modes (1)–(12), wherein the plugging-braking means is operated to initiate application of the reverse-drive electric current to the DC motor a first time after a moment of termination of application of the forward-drive electric current by the forward motor driving means, and the forward motor driving means is operated to initiate the application of the forward-drive electric current to the DC motor a second time after a moment of termination of the application of the reverse-drive electric current.

If the applications of the forward-drive electric current and the reverse-drive electric current follow each other, without a time interval therebetween, there may arise problems due to a difference in the switching speeds between the forward motor driving means and the plugging-braking means. The problems include a failure of the electric current to flow through the DC motor, namely, a flow of the electric current between switching elements of the forward motor driving means and/or the plugging-braking means, some other unstable operating behaviors of the DC motor, and breakage or destruction of the switching elements in the worst case. In the apparatus according to the above mode (13), there are provided time intervals between the moment of termination of the application of the forward-drive electric current and the moment of initiation of the application of the reverse-drive electric current, and between the moment of termination of the application of the reverse-drive electric current and the moment of initiation of the next application of the forward-drive electric current. Accordingly, the present apparatus is effective to prevent breakage of the switching elements, and unexpected application of a dynamic brake to the DC motor, so that the stop position of the DC motor can be controlled with higher accuracy.

(14) An apparatus for controlling deceleration of a DC motor which is driven in a forward operating direction with a forward-drive electric current applied thereto by forward motor driving means, wherein the forward motor driving means applies the forward-drive electric current in the form of pulses to the DC motor during deceleration of the DC motor, the apparatus comprising:

dynamic braking means operable while the DC motor is subjected to a regenerative brake or operated in a non-braked state, for applying a dynamic-brake electric current in the form of pulses to said DC motor, so as to short-circuit the DC motor to apply a dynamic brake to the DC motor, such that at least one pulse of the dynamic-brake electric current follows every predetermined number of pulses of the forward-drive electric current.

In the DC-motor deceleration control apparatus constructed according to the above mode (14) of the present invention, the plugging-braking means provided in the apparatus according to the above mode (1) is replaced by the dynamic braking means for applying a dynamic-brake electric current in the form of pulses to the DC motor, so as to short-circuit the DC motor, to apply a dynamic brake to the DC motor, such that at least one pulse of the dynamic-brake electric current follows every predetermined number of pulses of the forward-drive electric current, so that a kinetic energy of the DC motor is converted into an electric energy, which is dissipated as heat in the short circuit. The dynamic brake provides a comparatively large retarding or braking force to be applied to DC motor, so that the DC motor can be smoothly decelerated and can be brought to a stop in a relatively short time, and the stop position of the DC motor can be accurately controlled.

(15) An apparatus according to the above mode (14), wherein the at least one pulse of the dynamic-brake electric current follows every pulse of the forward-drive electric current

(16) An apparatus according to the above mode (14) or (15), wherein the at least one pulse of the dynamic-brake electric current follows every predetermined two or more number of pulses of the forward-drive electric current, for instance, every two pulses of the forward-drive electric current.

(17) An apparatus according to any one of the above modes (14)–(16), wherein the at least one pulse of the dynamic-brake electric current consists of one pulse of the dynamic-brake electric current, which follows every pulse of the forward-drive electric current, for example.

(18) An apparatus according to any one of the above modes (14)–(17), wherein the at least one pulse of the dynamic-brake electric current consists of at least two pulses of the dynamic-brake electric current, which follow every pulse of the forward-drive electric current, for example.

(19) An apparatus according to any one of the above modes (14)–(18), wherein the at least one pulse of the dynamic-brake electric current consists of at least two pulses of the dynamic-brake electric current which follow every predetermined two or more number of pulses of the forward-drive electric current, for example every two pulses of the forward-drive electric current.

(20) An apparatus according to any one of the above modes (14)–(19), wherein the predetermined number of pulses of the forward-drive electric current is changed in at least two steps during the deceleration of the DC motor. For example, at least one pulse of the dynamic-brake electric current follows every pulse of the forward-drive electric current in an initial portion of the deceleration period of the DC motor, and every two pulses of the forward-drive electric current in the subsequent portion of the deceleration period.

(21) An apparatus according to any one of the above modes (14)–(20), wherein the number of the at least one pulse of the dynamic-brake electric current is changed in at least two steps during the deceleration of the DC motor. For instance, two pulses of the dynamic-brake electric current follow every pulse of the forward-drive electric current in the initial portion of the deceleration period, but only one pulse of the dynamic-brake electric current follows every pulse of the forward-drive electric current in the subsequent portion of the deceleration period.

(22) An apparatus according to any one of the above modes (14)–(21), further comprising a period timer operable to detect a predetermined constant time interval at which application of the forward-drive electric current to the DC motor is initiated.

(23) An apparatus according to any one of the above modes (14)–(22), wherein a pulse width of the dynamic brake has a predetermined proportional relationship with that of the forward-drive electric current.

(24) An apparatus according to the above mode (23), further comprising pulse-width reducing means for gradually reducing a pulse width of the forward-drive electric current.

(25) An apparatus according to any one of the above modes (14)–(24), wherein the dynamic braking means is operated to initiate application of said dynamic brake to said DC motor a first time after a moment of initiation of application of said regenerative brake to said DC motor, and to terminate the application of said dynamic brake a second time before a moment of termination of the application of said regenerative brake.

(26) An apparatus according to any one of the above modes (14)–(25), wherein the dynamic braking means is operated to initiate application of the dynamic brake to the DC motor a first time after a moment of termination of application of the forward-drive electric current by the forward motor driving means, and the forward motor driving means is operated to initiate the application of the forward-drive electric current to the DC motor a second time after a moment of termination of the application of the dynamic brake.

The DC-motor deceleration control apparatuses according to the above modes (15)–(26) have substantially the same advantages as the apparatuses according to the above modes (2)–(13).

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 8 is a time chart indicating an operation of a drive-pulse generator of the deceleration control portion;

FIG. 10A is a view showing the waveforms of the input signals according to a fourth embodiment of the invention;

FIGS. 10B and 10C are views showing the waveforms of the input signals according to fifth and sixth embodiments of the invention, respectively;

FIGS. 11 and 12 are views showing the waveforms of the input signals S1 and S2 according seventh and eighth embodiments of the invention, respectively;

DETAILED DESCRIPTION OF THE PREFERRED EMBODIMENTS

Figure 1:
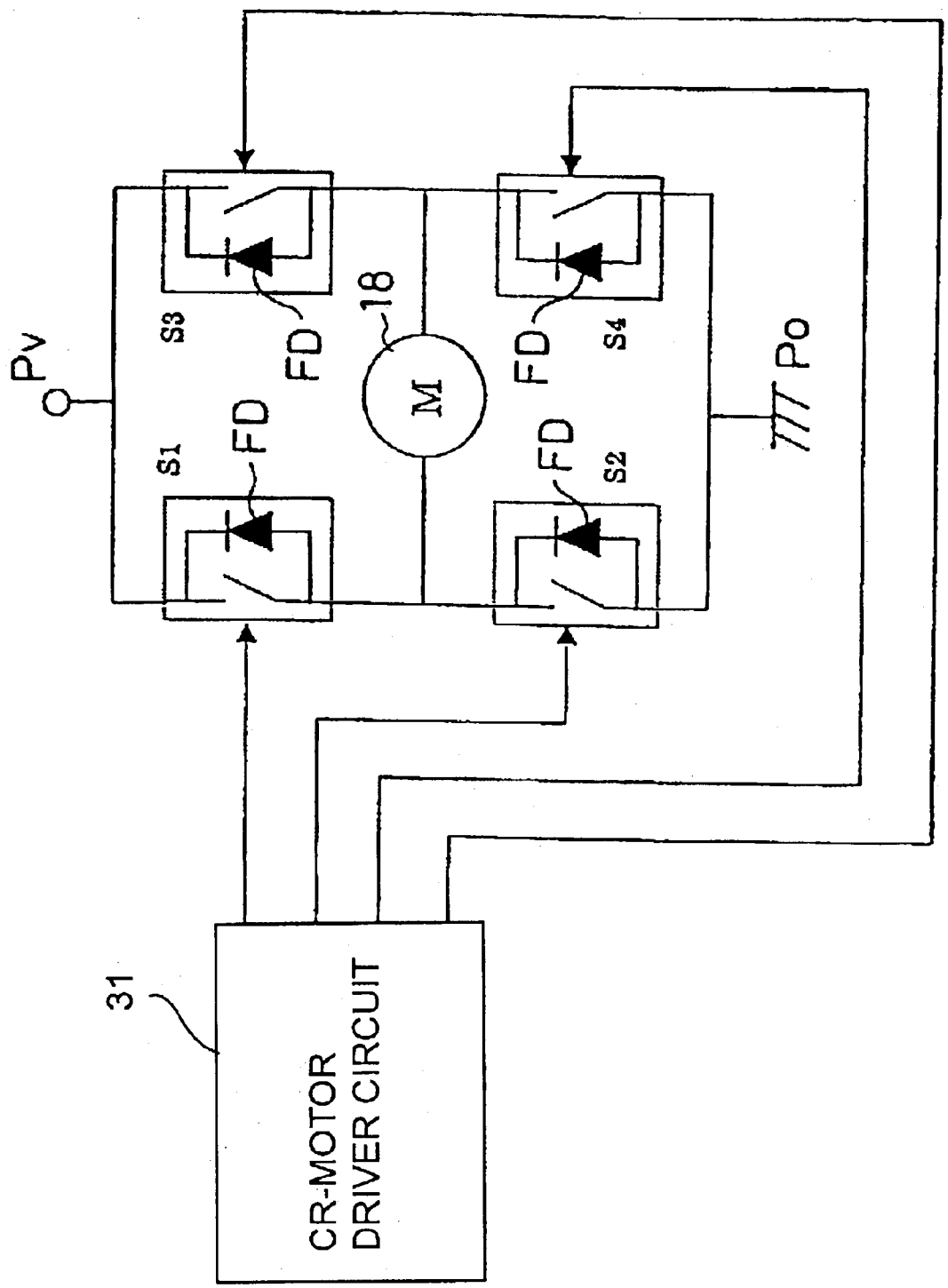
FIG. 1 is a view for explaining a driver device to drive a carriage drive motor, which is used in the prior art and in the present invention.

There will be described a preferred embodiment of the present invention, by reference to the accompanying drawings. Referring first to the perspective view of FIG. 2, there is shown a carriage drive mechanism in a printer incorporating a DC-motor deceleration control apparatus constructed according to one embodiment of the invention. The printer has a printing head 20 of so-called ink-jet type which is mounted on a carriage 14 and which is arranged to inject an ink from ink chambers through nozzles toward a recording medium in the form of a sheet of paper 12. Each ink chamber is partially defined by a wall provided with a piezoelectric element, which is energized with a voltage applied thereto, to change the volume of the ink chamber so that the ink is delivered from the ink chamber. The printer has a sheet feeding mechanism which includes presser rolls 28 and which is arranged to feed the sheet of paper 12 in a predetermined feeding direction. The printer further has a guide rod 16 disposed so as to extend in a width direction of the paper sheet 12, which is perpendicular to the above-indicated feeding direction. The carriage 14 is slidably supported and guided by the guide rod 16.

The carriage 14 is connected to an endless belt 17 extending in parallel with the guide rod 16, and is held in engagement with a driving pulley 22 and a driven or idler pulley (not shown). The driving pulley 22 is driven by a carriage drive motor 18 (hereinafter referred to as "CR motor 18") located at one end of the guide rod 16, while the idler pulley is located at the other end of the guide rod 16. The carriage 14 is reciprocated in the width direction of the paper sheet 12 parallel to the guide rod 16. Under the guide rod 16, there is disposed a linear timing scale 24 extending along the guide rod 16. The timing scale 24 has 90 equally-spaced slits per inch, and is formed of a light-transparent material. At a front portion of the underside of the carriage 14, there is disposed a sensing element 26 arranged to detect the slits of the linear timing scale 24 and generate pulse signals indicative of the position of the carriage 14.

Figure 2:
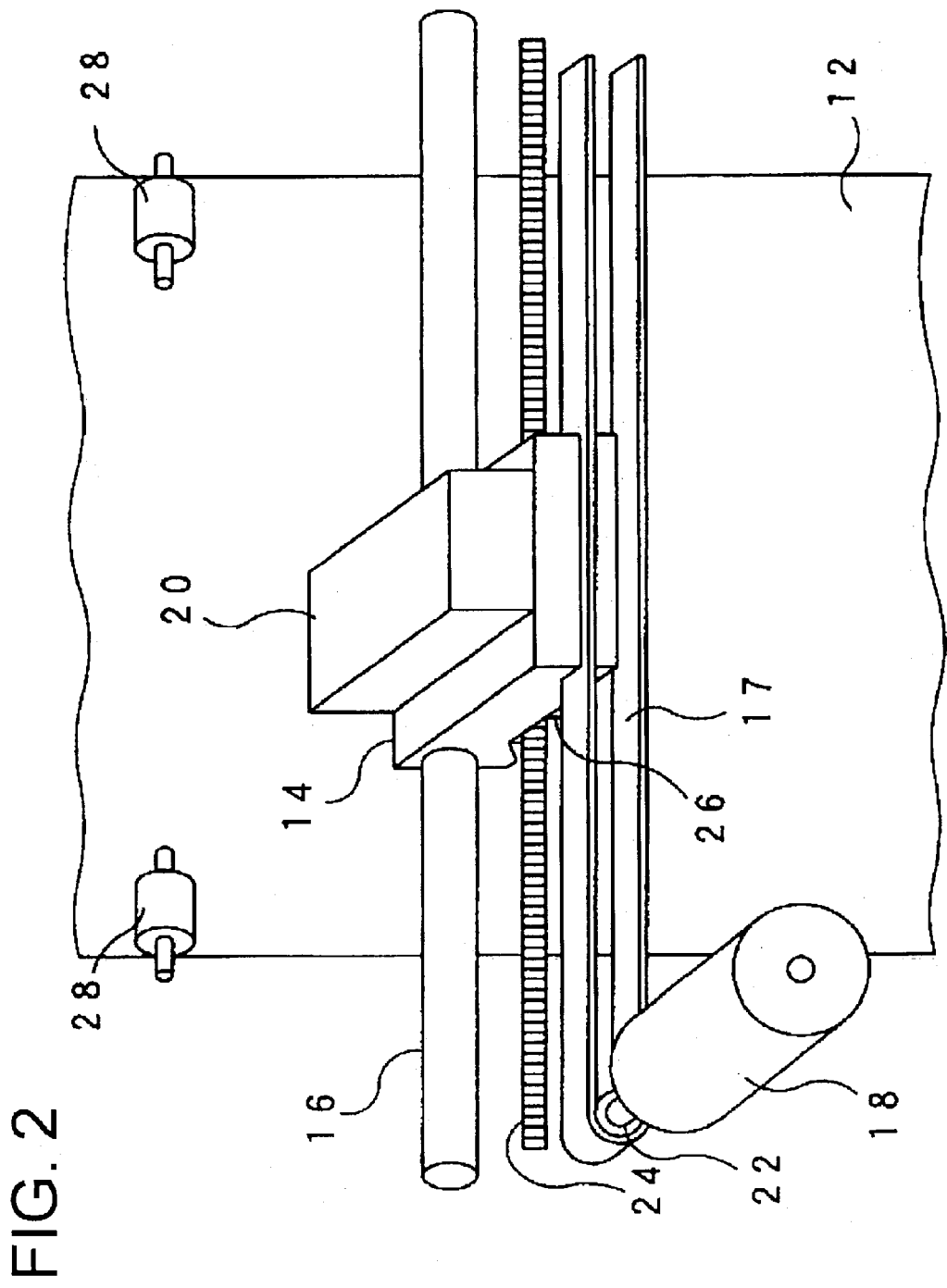
FIG. 2 is a perspective view showing a carriage drive mechanism to move a carriage in a printer using the motor driver device.

The sensing element 26 is a photo-interrupter including a light-emitting element and a light-receiving or photosensitive element. The photo-interrupter generates two kinds of encoder signals (first and second encoder signals) which have a phase difference of 90° (¼ of the period). When the carriage 14 is moved in a forward direction (right direction as seen in FIG. 2) from the driving pulley 22 toward the idler pulley, the phase of the first encoder signal is advanced by ¼ of the period with respect to the second encoder signal. When the carriage 14 is moved in a reverse direction from the idler pulley toward the driving pulley 22, the phase of the first encoder signal is retarded by ¼ of the period with respect to the second encoder signal. Thus, the direction of movement of the carriage 14 can be detected on the basis of the two encoder signals generated by the sensing element 26. The timing scale 24 and the sensing element 26 cooperate to constitute a linear encoder. The period of the pulse signals of the sensing element 26 corresponds to the spacing distance of the slits of the timing scale 24 and the moving speed of the carriage 14.

The sheet feeding mechanism including the presser rollers 28 further includes feed rollers (not shown) which are driven by a sheet feeding motor (not shown) and which cooperate with the presser rollers 28 to pinch the paper sheet 12 therebetween and feed the paper sheet 12 in a direction perpendicular to its width direction. The CR motor 18 is a DC motor whose operating speed is controllable by pulse width modulation (PWM), while the sheet feeding motor is a DC motor or a stepping motor.

Figure 3:
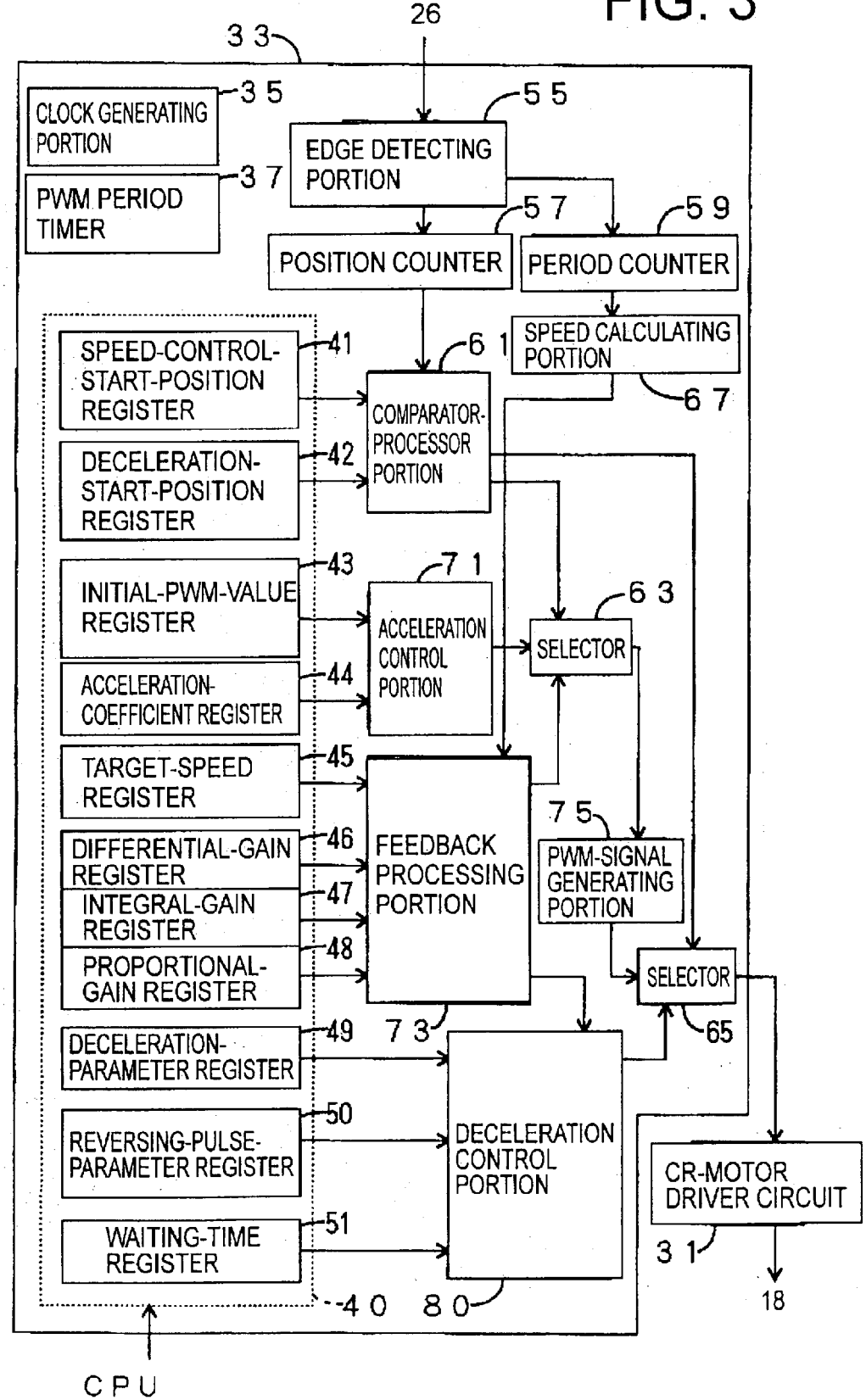
FIG. 3 is a block diagram showing a carriage motor control assembly incorporated in the printer and constructed according to a first embodiment of this invention.

In the present embodiment, the motor driver device for driving the CR motor 18 is shown in FIG. 1. As described before, the motor driver device includes the CR-motor driver circuit 31. This CR-motor driver circuit 31 is connected to a carriage motor control assembly 33 (hereinafter referred to as "CR-motor control assembly 33"), which includes a clock generating portion 35, a PWM period timer 37, and an operation-mode setting register array 40, as shown in FIG. 3. The clock generating portion 35 is provided to generate a timing clock used by various elements of the assembly 33. The PWM period timer 37 is arranged to count the number of pulses of the clock signal generated by the clock generating portion 35, during a predetermined PWM period. The operation-mode setting register array 40 is provided to store various parameters set by a central processing unit (CPU) to define an operation mode of the CR-motor control assembly 33.

Figure 4:
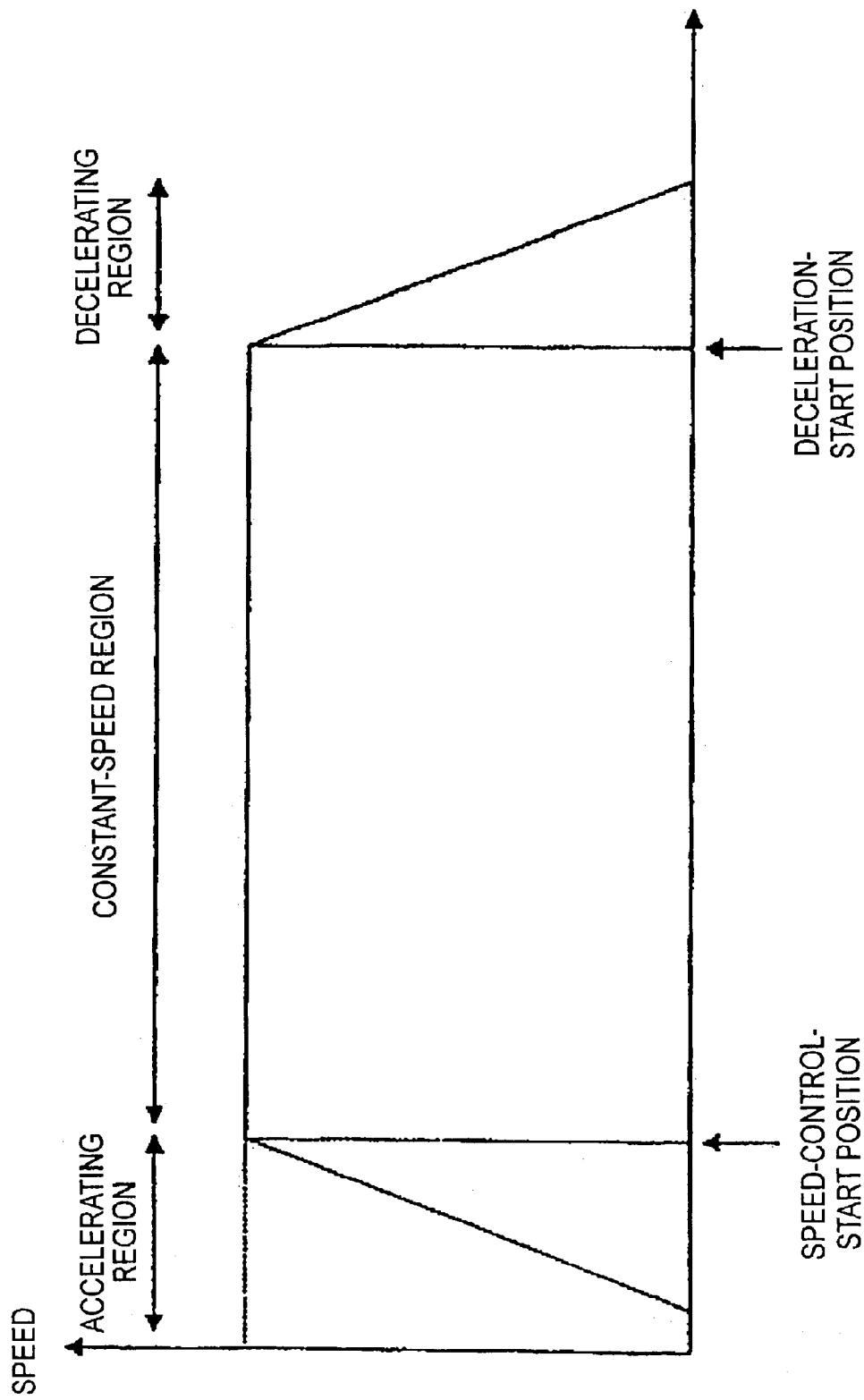
FIG. 4 is a view schematically illustrating a manner in which a moving speed of the carriage is controlled by the carriage motor control assembly.

The operation-mode setting register array 40 includes: a speed-control-start-position register 41 for storing a speed-control-start position (printing-start position or acceleration-end position: shown in FIG. 4) at which the control of the moving speed of the carriage 14 is initiated; a deceleration-start-position register 42 for storing a deceleration-start position (printing-end position; also shown in FIG. 4) at which the deceleration of the carriage 14 is initiated; an initial-PWM-value register 43 for storing an initial PWM value; an acceleration-coefficient register 44 for storing an acceleration coefficient; a target-speed register 45 for storing a target value of the moving speed of the carriage 14; a differential-gain register 46 for storing a differential gain; an integral-gain register 47 for storing an integral gain; a proportional-gain register 48 for storing a proportional gain; a deceleration-parameter register 49 for storing a deceleration parameter decel_param; a reversing-pulse-parameter register 50 for storing a reversing-pulse parameter R_Ratio; and a waiting-time register 51 for storing waiting times T1 and T2. The parameters stored in the various registers 41–51 will be described below.

The CR-motor control assembly 33 further includes an edge detecting portion 55, a position counter 57, a period counter 59, a comparator-processor portion 61, two selectors 63, 65, a speed calculating portion 67, an acceleration control portion 71, a feedback processing portion 73, a PWM-signal generating portion 75 and a deceleration control portion 80.

The encoder signals generated by the sensing element 26 are applied to the edge detecting portion 55, which detects the slits of the linear timing scale 24 and generates edge signals. The position counter 57 and the period counter 59 receive the edge signals. The position counter 57 is arranged to count the edge signals generated by the edge detecting portion 55, and the comparator-processor portion 61 receives an output of the position counter 57 which indicates the position of the carriage 14. The comparator-processor portion 61 compares the output of the position counter 57 with the values stored in the speed-control-start-position register 41 and the deceleration-start-position register 42, which represent the speed-control-start position and the deceleration-start position, respectively. The selectors 63, 65 receive an output of the comparator-processor portion 61.

The period counter 59 is arranged to detect a period of the edge signals generated by the edge detecting portion 55, by counting the number of the clock signals generated by the clock generating portion 35. The speed calculating portion 67 receives an output of the period counter 59, and calculates the moving speed of the carriage 14, by dividing a predetermined speed-calculating constant by the count of the period counter 59.

The acceleration control portion 71 calculates the duty ratio for controlling the CR motor 18 in an open-loop manner, on the basis of the initial PWM value stored in the initial-PWM-value register 43 and the acceleration coefficient stored in the acceleration-coefficient register 44. An output of the acceleration control portion 71 is applied to the selector 63.

The feedback processing portion 73 calculates the duty ratio for controlling the CR motor 18 such that the moving speed of the carriage 14 as calculated by the speed calculating portion 67 coincides with the target speed stored in the target-speed register 45. An output of the feedback processing portion 73 is also applied to the selector 63. The calculation by the feedback processing portion 73 is based on the differential, integral and proportional gains stored in the differential-gain register 46, integral-gain register 47 and proportional-gain register 48, respectively.

The selector 63 is arranged to supply the PWM-signal generating portion 75 with the output signal of the acceleration control portion 71 before the selector 63 receives from the comparator-processor portion 61 an output signal indicating that the carriage 14 has reached the speed-control-start position (acceleration-end position). After the selector 63 has received the above-indicated output signal from the comparator-processor portion 61, the selector 63 supplies the PWM-signal generating portion 75 with the output signal of the feedback processing portion 73. The PWM-signal generating portion 75 generates a motor control signal on the basis of the output signal of the selector 63. The generated motor control signal is applied to the CR-motor driver circuit 31 through the selector 65.

The deceleration control portion 80 is arranged to generate a deceleration control signal for, controlling the CR motor 18 in an open-loop manner to control the deceleration of the carriage 14. This deceleration control signal is generated on, the basis of the deceleration parameter decel_param stored in the deceleration-parameter register 49, the reversing-pulse parameter R_Ratio stored in the reversing-pulse-parameter register 50, and waiting times T1, T2 stored in the waiting-time resister 51. The generated deceleration control signal is applied to the CR-motor driver circuit 31 through the selector 65.

The selector 65 is arranged to supply the CR-motor driver circuit 31 with the motor control signal received from the PWM-signal generating portion, before the selector 65 receives from the comparator-processor portion 61 an output signal indicating that the carriage 14 has reached the deceleration-start position (printing-end position). After the selector 65 has received the above-indicated output signal, the selector 65 supplies the CR-motor driver circuit 31 with the deceleration control signal received from the deceleration control portion 80. With the operations of the two selectors 63, 65, the CR motor 18 is controlled in the open-loop manner, under the control of the acceleration control portion 71, so as to accelerate the carriage 14 in an accelerating region or period, that is, until the carriage 14 has reached the speed-control-start position, as indicated in FIG. 4. In the following constant-speed region between the speed-control-start position and the deceleration-start position, the CR motor 18 is controlled in a feedback manner under the control of the feedback processing portion 73, so as to move the carriage 14 at a constant speed. In the following decelerating region or period after the carriage 14 has reached the deceleration-start position, the CR motor 18 is controlled in an open-loop manner, under the control of the deceleration control portion 80, so as to decelerate the carriage 14.

The arrangement and operation of the deceleration control portion 80 will be described in detail, by reference to the block diagram of FIG. 5. As described below in detail by reference to FIG. 9A, the deceleration control portion 80 is arranged to gradually reduce the duty ratio (ON time ratio) of a forward-drive electric current to be applied to the CR motor 18, and apply to the CR motor 18 a reverse-drive electric current in the form of pulses, while the CR motor 18 is subjected to a regenerative brake in each time duration during which the forward-drive electric current is not applied to the CR motor 18.

Figure 5:
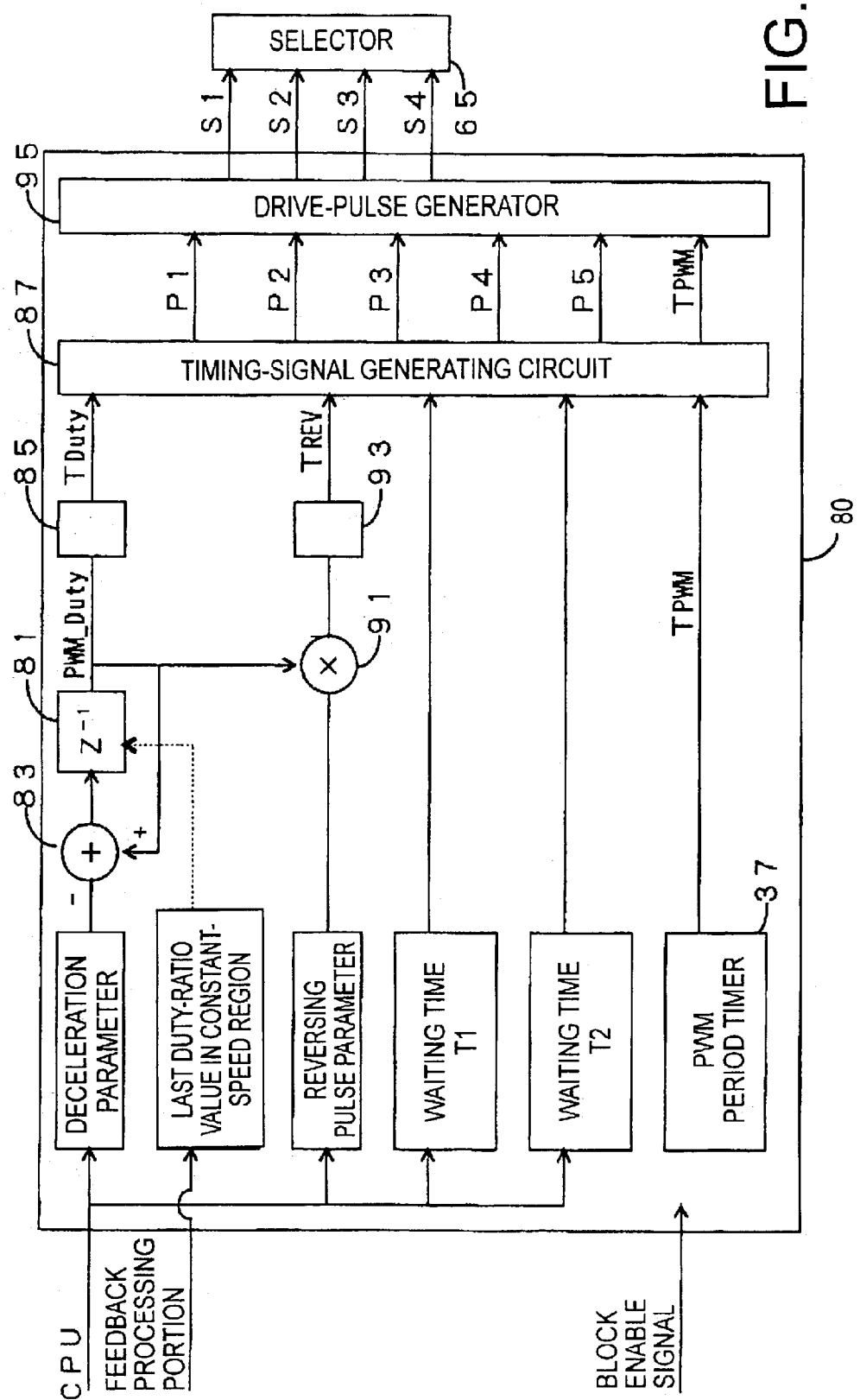
FIG. 5 is a block diagram showing an arrangement of a deceleration control portion of the carriage motor control assembly.
Figure 6:
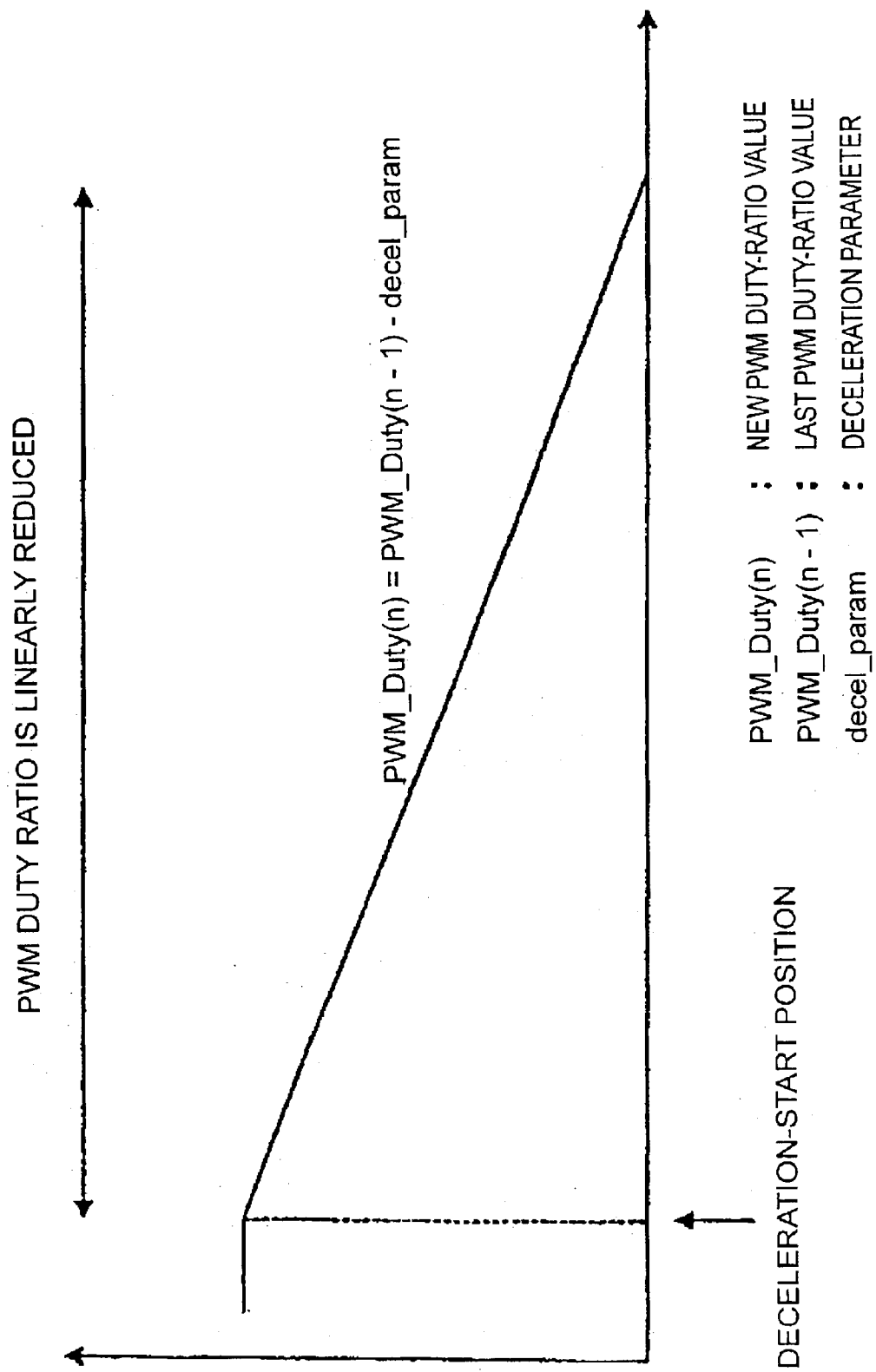
FIG. 6 is a view for explaining a change in PWM duty-ratio in a decelerating region indicated in FIG. 4.

As shown in FIG. 5, a last duty-ratio value generated by the feedback processing portion 73 in the constant-speed region (last PWM duty-ratio value) is applied to a delaying element 81 of the deceleration control portion 80. This delaying element 81 is connected to an adder 83, which is disposed upstream of the delaying element 81 and which receives the deceleration parameter decel_param as a negative value. An output of the delaying element 81 in the form of a PWM duty-ratio value PWM_Duty is fed back to the adder 83 as a positive value. Thus, the adder 83 and the delaying element 81 cooperate to define a loop so that the PWM duty-ratio value PWM_Duty is linearly reduced as indicated in FIG. 6. The PWM duty-ratio value PWM_Duty is converted by an operator 85 into a value $T_{Duty}$ according to the following equation, and the thus obtained value $T_{Duty}$ is applied to a timing-signal generating circuit 87.

$$T_{Duty} = T_{PWM}/2^n \times PWM\_Duty$$

wherein, $T_{PWM}$=PWM period

2^n=PWM resolution (e.g., 1024 steps, where n=10)

The PWM duty-ratio value PWM_Duty is also applied to a multiplier 91, which multiplies the PWM duty-ratio value PWM_Duty by the reversing-pulse parameter R_Ratio (a constant smaller than 1), to obtain a value REV which is applied to an operator 93. Like the operator 85, the operator 93 converts the value REV into a value $T_{REV}$ according to the following equation, and the thus obtained value $T_{REV}$ is applied to the timing-signal generating circuit 87.

$$T_{REV} = T_{PWM}/2^n \times REV$$

where, $T_{PWM}$=PWM period

2^n=PWM resolution (e.g., 1024 steps where n=10)

The timing-signal generating circuit 87 receives the waiting times T1 and T2 stored in the waiting-time register 51, and the signal $T_{PWM}$ generated by the PWM period timer 37, as well as the values $T_{Duty}$ and $T_{REV}$.

Figure 7:
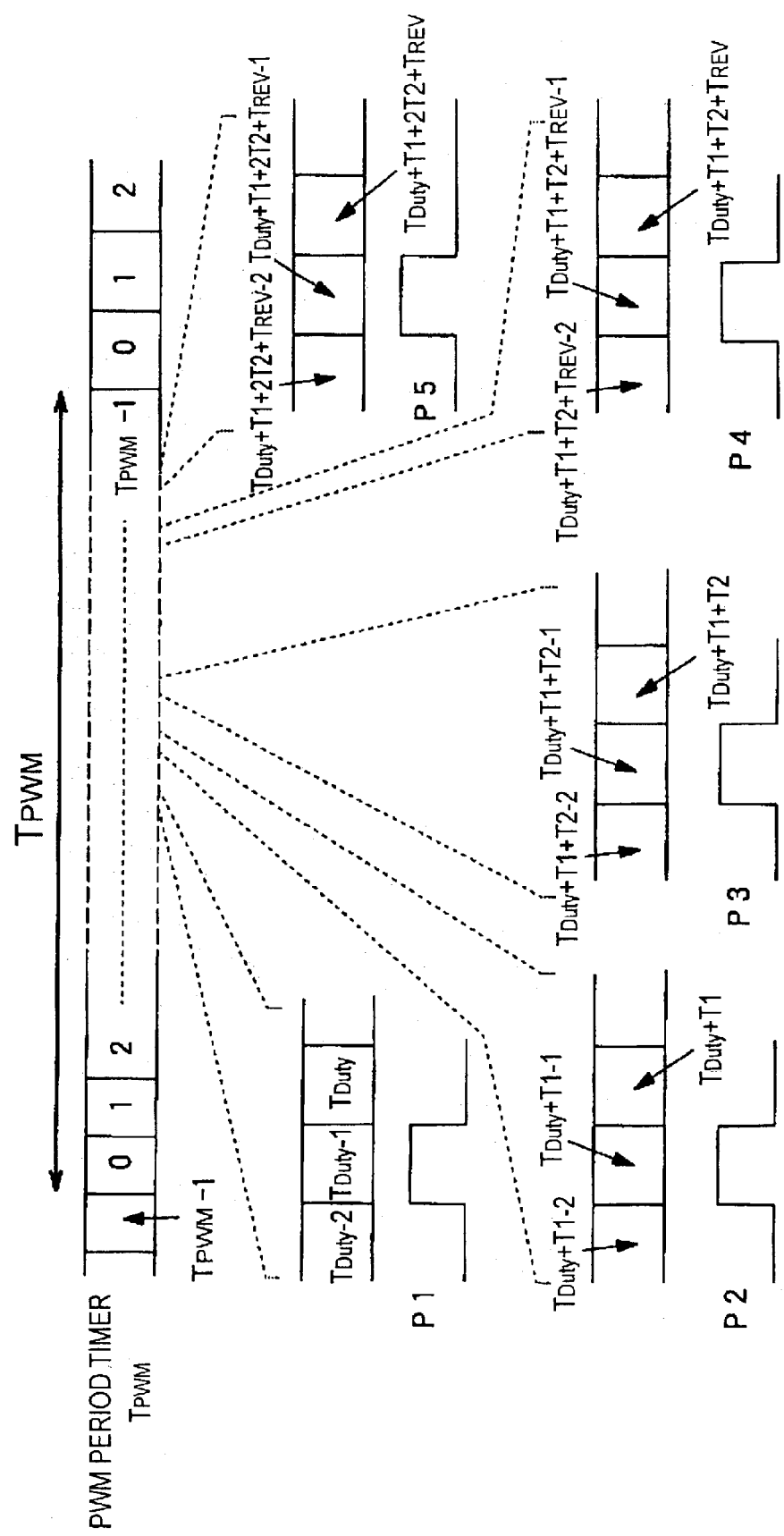
FIG. 7 is a time chart indicating an operation of a timing-signal generating circuit of the deceleration control portion.

As shown in FIG. 7, the PWM period timer 37 repeats the counting of pulses 0 through $T_{PWM}-1$ during each PWM period $T_{PWM}$. The timing-signal generating circuit 87 generates a rectangular pulse P1 when the output of the PWM period timer 37 becomes equal to $T_{Duty}-1$, as also shown in FIG. 7. Then, the timing-signal generating circuit 87 generates a rectangular pulse P2 when the output of the PWM period timer 37 becomes equal to $T_{Duty}+T1-1$, and then generates a rectangular pulse P3 when the output of the PWM period timer 37 becomes equal to $T_{Duty}+T1+T2-1$. Subsequently, the timing-signal generating circuit 87 generates a rectangular pulse P4 when the output of the PWM period timer 37 becomes equal to $T_{Duty}+T1+T2+T_{REV}-1$, and then generates a rectangular pulse P5 when the output of the PWM period timer 37 is equal to $T_{Duty}+T1+2 \times T2+T_{REV}-1$.

If the time $T_{Duty}+T1+2 \times T2+T_{REV}$ is longer than the PWM period $T_{PWM}$, that is, if the pulse P5 is generated according to the above equations at a moment within the next PWM period, the timing-signal generating circuit 87 generates the pulse P4 when the output of the PWM period timer 37 becomes equal to $T_{PWM}-T2-1$, and generates the pulse P5 immediately before the output becomes equal to $T_{PWM}-1$. If the time $T_{Duty}+T1+2 \times T2$ is equal to or longer than the PWM period $T_{PWM}$, the timing-signal generating circuit 87 does not generates the pulses P2–P5.

The pulses P1–P5 generated by the timing-signal generating circuit 87 are applied to the drive-pulse generator 95, as indicated in FIG. 5. The drive-pulse generator 95 generates signals S1–S4 for driving or turning on the switching elements S1–S4, on the basis of the output of the PWM period timer 37 and the pulses P1–P5, in the manner as described below. The signals S1–S4 are applied to the selector 65.

The operation of the drive-pulse generator 95 is shown in the time chart of FIG. 8. When the output of the PWM period timer 37 has changed from $T_{PWM}-1$ to 0, the drive-pulse generator 95 generates the signal S1, that is, places the signal S1 in the high state. This signal S1 is applied through the CR-motor driver circuit 31 to the switching element S1, so that the switching element S1 is turned on. The other signals S2–S4 have functions similar to that of the signal S1. While the signal S1 is in the high state, the signals S2 and S3 are in the low state while the signal S4 is in the high state, as indicated in FIG. 8. Thus, the switching elements S1 and S4 are turned on when the signal S1 is placed in the high state, so that a pulse of a forward-drive electric current is applied to the CR motor 18 in the forward-drive direction.

When the pulse P1 is generated by the timing-signal generating circuit 87, the drive-pulse generator 95 places the signal S1 in the low state upon falling of the pulse P1, so that only the switching element S4 is placed in the on state, whereby a regenerative current flows through the switching element S4 and the flywheel diode FD of the switching element S1, so that a regenerative brake is applied to the CR motor 18.

When the pulse P2 is generated by the timing-signal generating circuit 87, the drive-pulse generator 95 places the signal S4 in the low state upon falling of the pulse P2, so that all of the switching elements S1–S4 are placed in the off state, whereby a regenerative current flows through the flywheel diodes FD of the switching elements S4 and S1, so that a regenerative brake is applied to the CR motor 18.

When the pulse P3 is generated by the timing-signal generating circuit 87, the drive-pulse generator 95 places the signals S2 and S3 in the high state upon falling of the pulse P3, so that the switching elements S2 and S3 are turned on, whereby a pulse of a reverse-drive electric current is applied to the CR motor 18 through the switching elements S2 and S3, in the reverse-drive direction, so that a plugging brake is applied to the CR motor 18.

When the pulse P4 is generated by the timing-signal generating circuit 87, the drive-pulse generator 95 places the signals S2 and S3 in the low state upon falling of the pulse P4, so that a flow of the regenerative current takes place as in the period between the moments at which the pulses P2 and P3 were generated. When the pulse P5 is generated by the timing-signal generating circuit 87, the drive-pulse generator 95 places the signal S4 in the high state upon falling of the pulse P5, so that a flow of the regenerative current takes place as in the period between the moments at which the pulses P1 and P2 were generated.

With the signals S1–S4 being controlled according to the pulses P1–P5 as described above, the CR motor 18 is controlled in the following manner to decelerate the carriage 14. Initially, the forward-drive electric current is applied to the CR motor 18 during the time $T_{Duty}$, to drive the CR motor 18 in the forward operating direction. Then, a regenerative brake is applied to the CR motor 18 for the time T1+T2, and the reverse-drive electric current is applied to the CR motor 18 during the time $T_{REV}$, such that the reverse-drive electric current flows in a direction corresponding to the reverse operating direction of the CR motor 18, so that a plugging brake is applied to the CR motor 18. Subsequently, a regenerative brake is again applied to the CR motor 18 during a time not shorter than the time T2, so that a regenerative brake is applied to the CR motor 18. A cycle of these control actions is repeated. Further, the time $T_{Duty}$ is gradually reduced during the deceleration of the carriage 14. In an initial portion of the deceleration in which the time $T_{Duty}$ is comparatively long, the time $T_{Duty}$+T1+2×T2 is equal to or longer than the PWM period $T_{PWM}$, and therefore the pulses P2–P5 are not generated as described above. In this case, therefore, the application of the forward-drive electric current and the regenerative brake to the CR motor 18 is repeated.

Figure 9A:
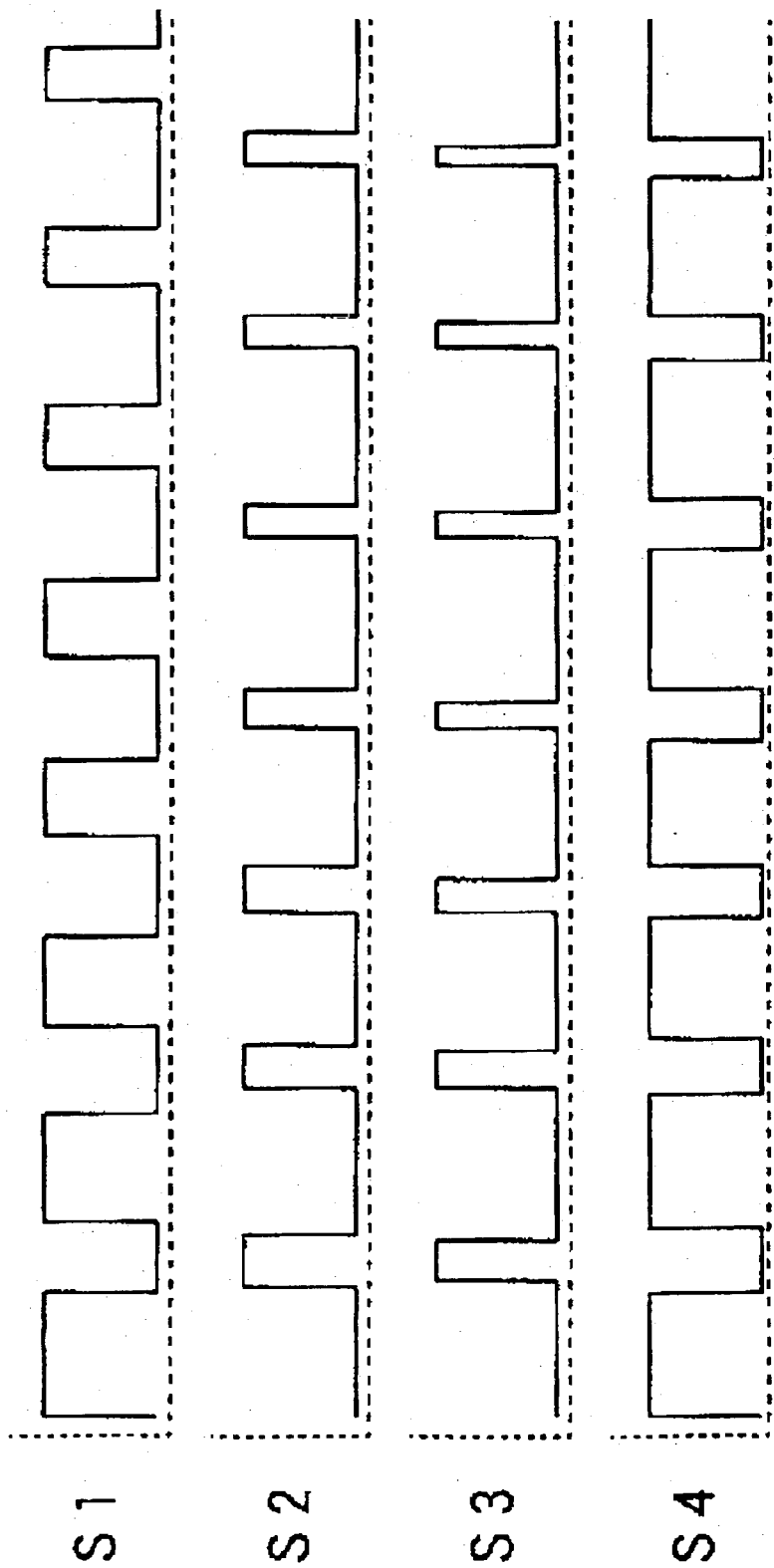
FIG. 9A is a view showing waveforms of input signals applied to the motor driver device in the first embodiment.

When the time $T_{Duty}$+T1+2×T2 has become shorter than the PWM period $T_{PWM}$, the reverse-drive electric current is applied to the CR motor 18, between the adjacent applications of the forward-drive electric current, such that the time T1+T2 precedes the application of the reverse-drive electric current and the time not shorter than T2 follows the application of the reverse-drive electric current, as indicated in FIG. 8. When a time (1+R_Ratio)×$T_{Duty}$+T1+2×T2 has become shorter than the PWM period $T_{PWM}$ as a result of the reduction of the time $T_{Duty}$, the pulse width ratio of the forward-drive and reverse-drive electric currents is held at 1:R_Ratio. Changes of the signals S1–S4 according to the operation of the deceleration control portion 80 are shown in FIG. 9A. When a value $T_{Duty}$×R_Ratio has been reduced to the above-indicated PWM resolution 2^n, with further reduction of the time $T_{Duty}$ and sufficient deceleration of the CR motor 18, the application of the reverse-drive electric current is terminated.

While the foregoing description refers to the deceleration control of the CR motor 18 during its operation in the forward direction, the deceleration control of the CR motor during its operation in the reverse direction is similar to that in the forward direction, except for a difference in the switching elements S1–S4 for which the above-described control actions are performed.

Figure 14A:
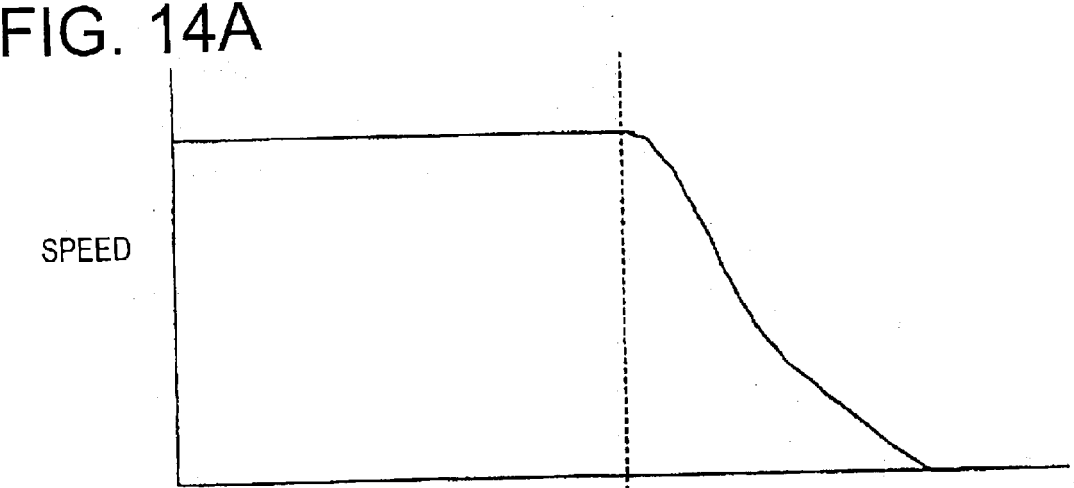
FIGS. 14A, 14B and 14C are views for explaining an advantage of the present invention over the prior art.
Figure 14B:
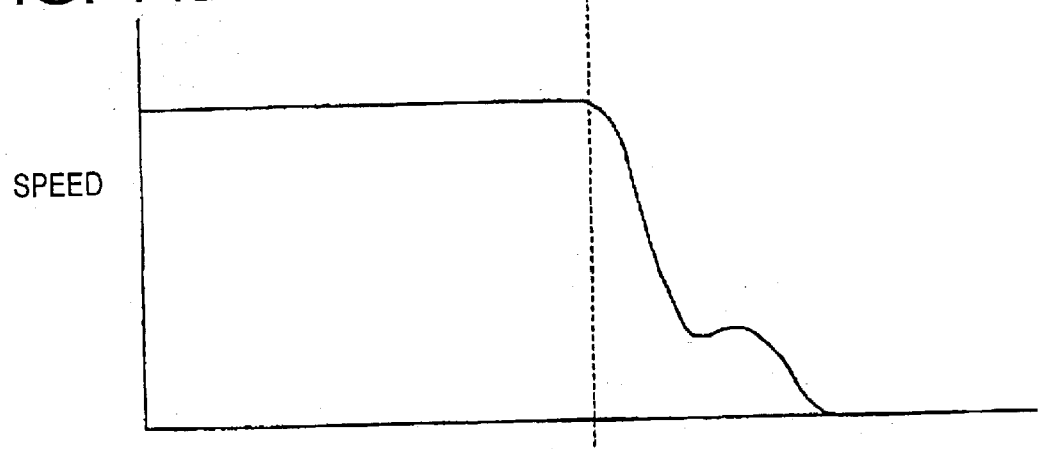
Figure 14C:
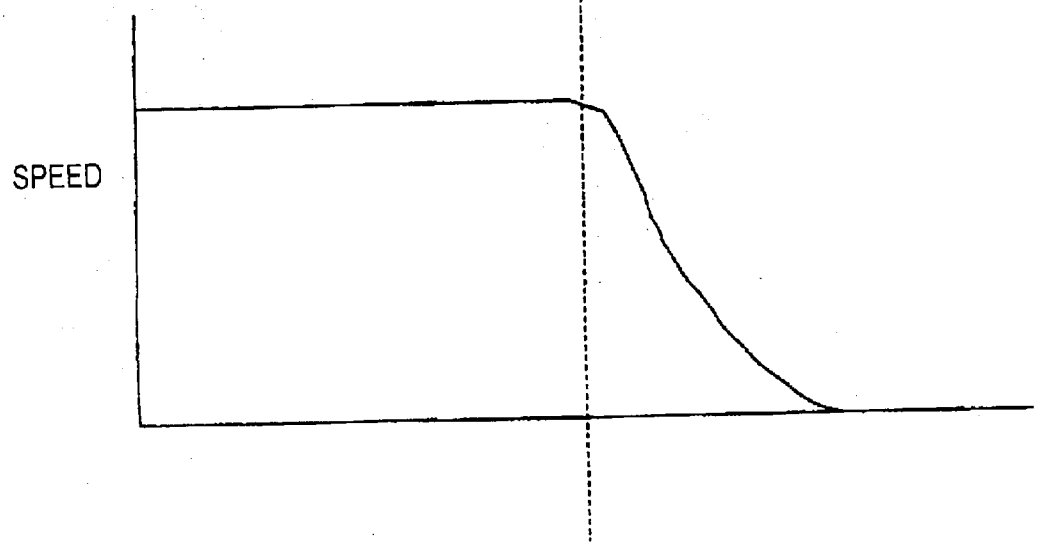

In the embodiment described above, the forward-drive electric current is applied in the form of pulses to the CR motor 18 during its deceleration, and the reverse-drive electric current is applied in the form of pulses to the CR motor 18 such that each pulse of the reverse-drive electric current is interposed between adjacent pulses of the forward-drive electric current, namely, one pulse of the reverse-drive electric current follows every pulse of the forward-drive electric current, while the CR motor 18 is subjected to a regenerative brake during interruption of the application of the forward-drive electric current. Thus, the present embodiment is arranged to apply to the CR motor 18 the pulses of the forward-drive electric current for smooth deceleration of the CR motor 18, as well as the pulses of the reverse-drive electric current for applying a plugging brake to the CR motor 18 so as to shorten the required deceleration time, as shown in FIG. 14C. Accordingly, the carriage 14 can be stopped at a desired or nominal position with high positioning accuracy. Further, the present embodiment is arranged to effect the deceleration control of the CR motor 18 while the control interval or period $T_{PWM}$ is held constant throughout the control, so that the control software and hardware can be simplified, permitting the present DC-motor deceleration control apparatus to be available at a significantly reduced cost.

In addition, the pulse width of the reverse-drive electric current has a predetermined proportional relationship with that of the forward-drive electric current, and the pulse width of the forward-drive electric current is made larger than that of the reverse-drive electric current, so that the control of the stop position of the CR motor 18 is facilitated. Further, the application of said reverse-drive electric current to the CR motor 18 is initiated the predetermined time T1+T2 after the moment of initiation of the application of the regenerative brake to the CR motor 18, and the application of the reverse-drive electric current is terminated more that the time T2 before the moment of termination of the application of the regenerative brake. In addition, the non-current-application time not shorter than the time T2 is provided between the moment of termination of the last application of the forward-drive electric current and the moment of initiation of the following application of the reverse-drive electric current, and between the moment of termination of this application of the reverse-drive electric current and the moment of initiation of the next application of the forward-drive electric current. This arrangement is effective to prevent an abrupt change in the operating speed of the CR motor 18, assuring a further improvement in the accuracy of control of the stop positions of the CR motor 18 and the carriage 14.

It is to be understood that the present invention is not limited to the details of the illustrated embodiment of FIG. 1 through FIG. 9A described above, and may be otherwise embodied without departing from the spirit of the present invention.

Figure 9B:
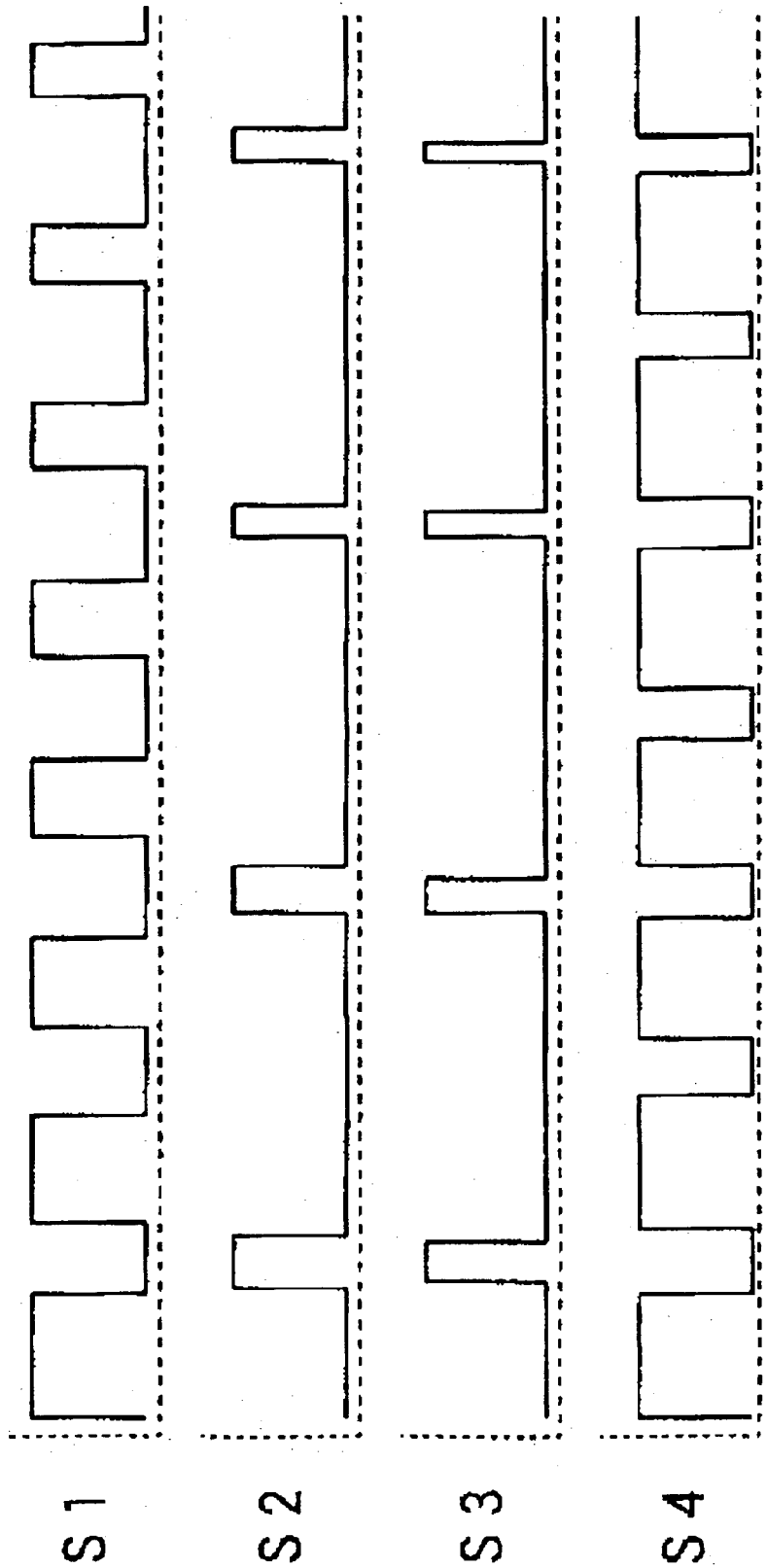
FIG. 9B and 9C are views showing the waveforms of the input signals according to second and third embodiments of the invention, respectively.

While the first embodiment of FIG. 9A is arranged such that one pulse of the reverse-drive electric current follows every pulse of the forward-drive electric current, one pulse of the reverse-drive electric current follows every two pulses of the forward-drive electric current, as in a second embodiment of this invention shown in FIG. 9B. Alternatively, two pulses of the reverse-drive electric current follow every pulse of the forward-drive electric current, as in a third embodiment shown in FIG. 9C.

Figure 9C:
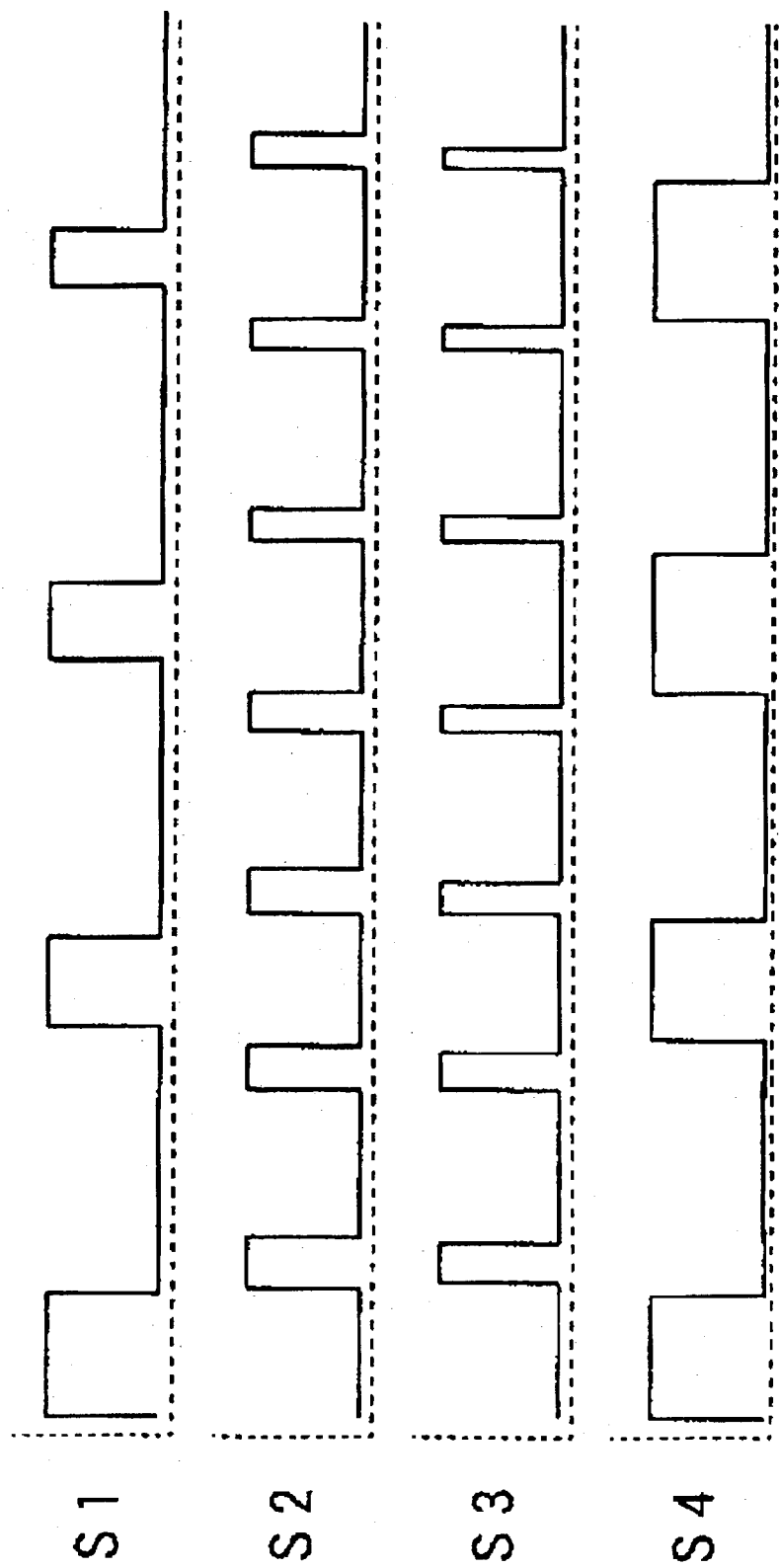
Figure 10B:
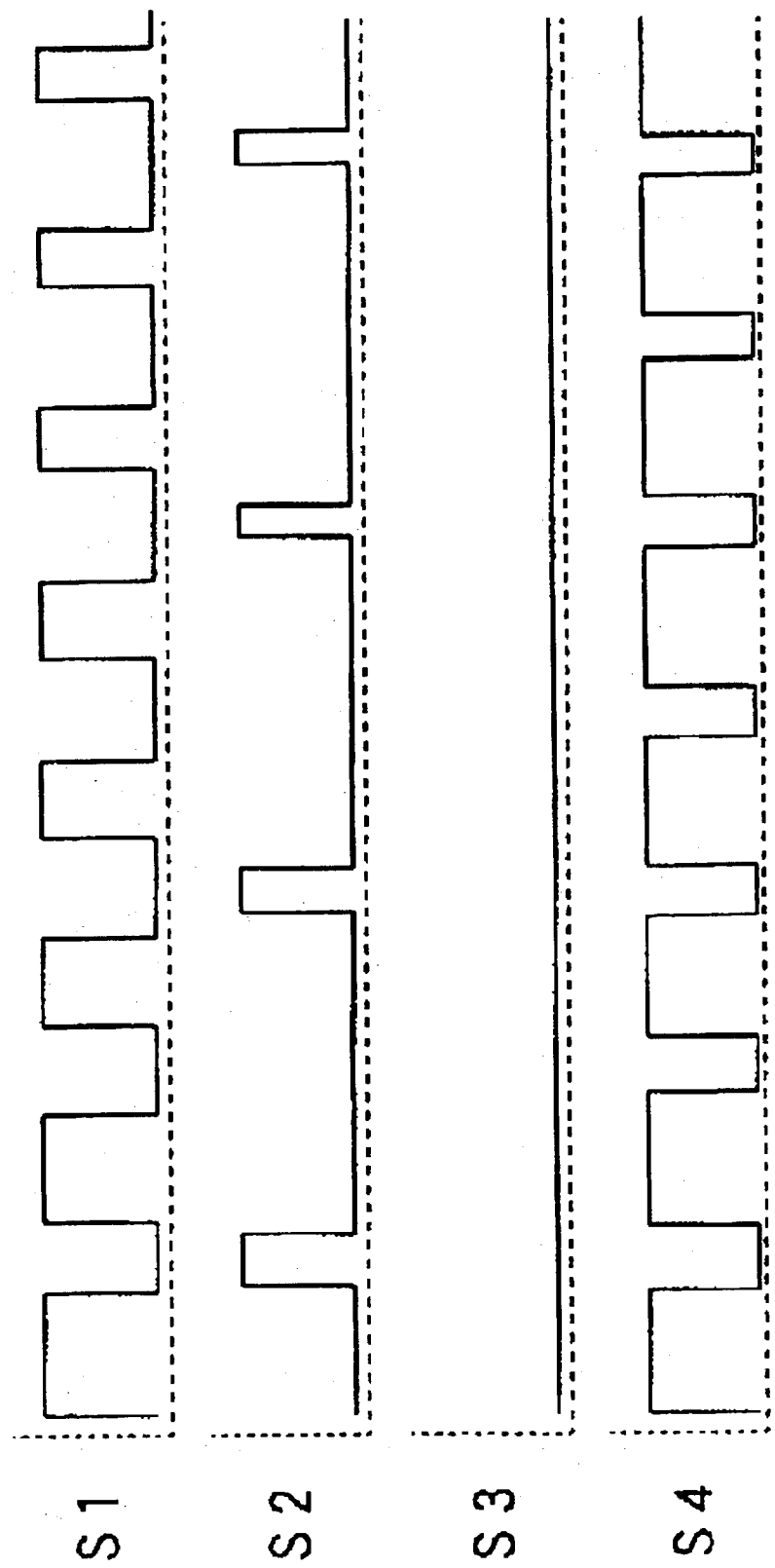

In the first, second and third embodiments of FIGS. 9A, 9B and 9C, the reverse-drive electric current is applied to the CR motor 18 during the application of the regenerative brake, to apply a plugging brake to the CR motor 18. However, the application of the plugging brake by applying the reverse-drive electric current as shown in FIGS. 8, 9A, 9B and 9C may be replaced by the application of a dynamic brake to the CR motor 18, which is effected by suitably controlling the signals S3 and S2, as indicated in FIGS. 10A, 10B and 10C by way of example. In a fourth embodiment shown in FIG. 10A, the waveforms of the signals S1–S4 are identical with those of FIG. 9A, except in that the signal S3 is held in the low state. When the signal S3 is placed in the low state while the signal S2 is placed in the high state, an electric current generated by the CR motor 18 operating as a generator flows in a loop including the flywheel diode FD of the switching element S4 and the switching element S2. Namely, a dynamic-brake electric current is applied to the CR motor 18, so as to short-circuit the CR motor 18 top apply a dynamic brake to the CR motor 18 such that a pulse of the dynamic-brake electric current follows every pulse of the forward-drive electric current, so that a kinetic energy of the CR motor 18 is converted into an electric energy, which is dissipated as heat in the short circuit. It is noted that dynamic braking can be effected by placing the signal S3 in the high state and the signal S2 in the low state.

In a fifth embodiment of FIG. 10B, a pulse of the dynamic-brake electric current follows every two pulses of the forward-drive electric current. In a sixth embodiment of FIG. 10C, two pulses of the dynamic-brake electric current follow every pulse of the forward-drive electric current.

Figure 11:
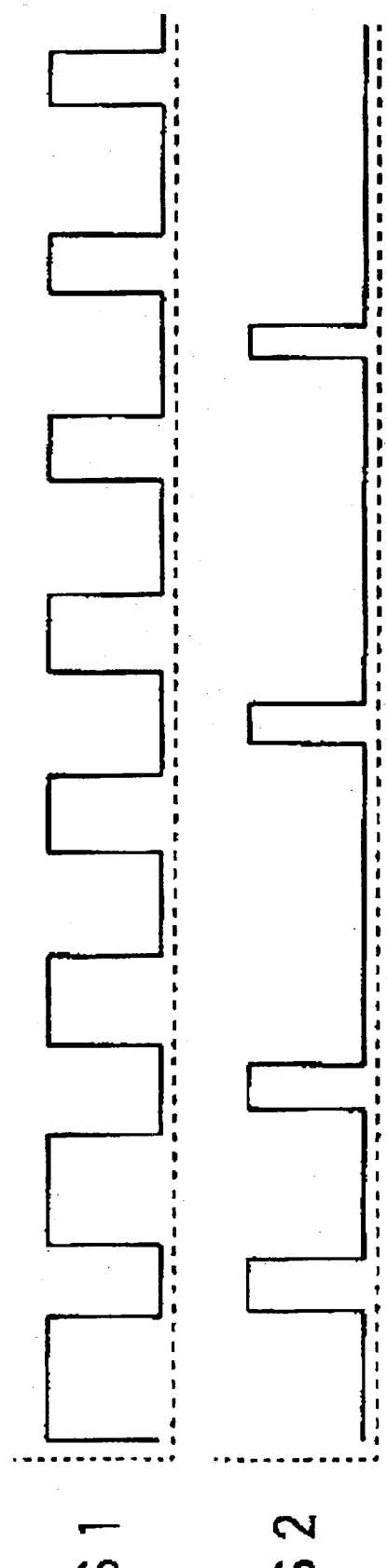
Figure 13A:
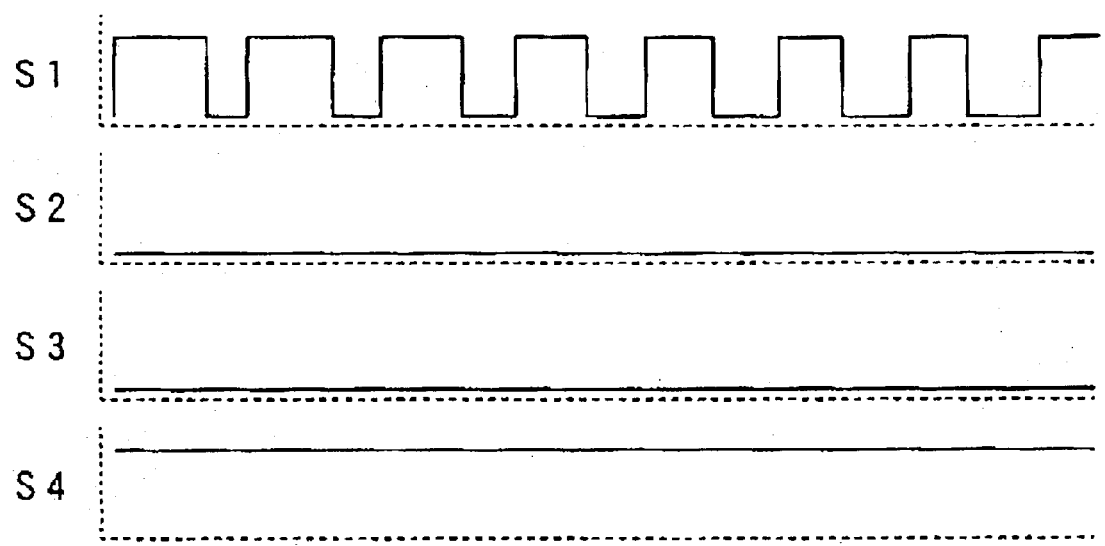
FIGS. 13A and 13B are views showing waveforms of input signals applied to the motor driver device in the prior art.
Figure 13B:
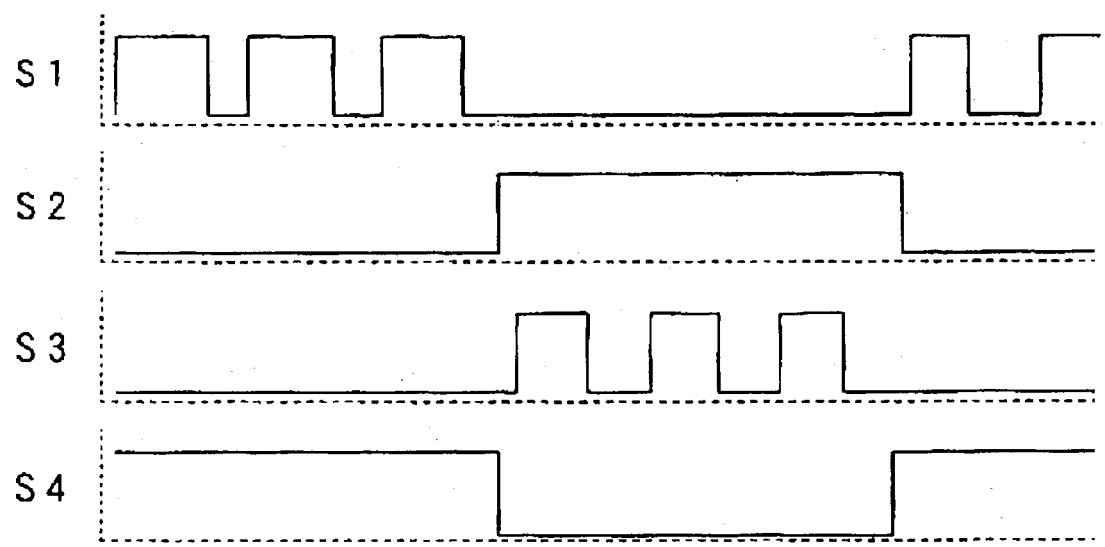

While the pulses of the reverse-drive electric current or the pulses of the dynamic-brake electric current are applied to the CR motor 18 at a predetermined constant time interval, the time interval at which the reverse-drive or dynamic-brake current pulses are applied may be changed during the deceleration of the CR motor 18. For instance, one pulse of the reverse-drive or dynamic-brake electric current follow every pulse of the forward-drive electric current in an initial portion of the deceleration period of the CR motor 18, but follows every two pulses of the forward-drive electric current in the subsequent portion of the deceleration period, as in a seventh embodiment of the invention shown in FIG. 11. Further alternatively, the number of pulses of the reverse-drive or dynamic-brake electric current following every pulse of the forward-drive electric current may be changed during the deceleration of the CR motor 18. For instance, two pulses of the reverse-drive or dynamic-brake electric current follow every pulse of the forward-drive electric current in the initial portion of the deceleration period, but only one pulse of the reverse-drive or dynamic-brake electric current follows every pulse of the forward-drive electric current, as in an eighth embodiment of the invention shown in FIG. 12.

Where the driver device for the CR motor 18 uses switching elements S1–S4 which are not provided with flywheel diodes FD, the regenerative brake described above with respect to the first embodiment is not applied to the CR motor 18, and the CR motor 18 is placed in a non-braked state or a freely rotatable state. In this case, the deceleration control portion may be arranged to apply the reverse-drive current to the CR motor 18 while the motor is in the non-braked state. This modification has substantially the same effect as the first embodiment. Although the deceleration control portion 80 in the illustrated embodiment uses a hardware to calculate the pulse width ($T_{Duty}$) of the forward-drive electric current, the moment of application of the reverse-drive electric current, and other conditions of the deceleration control, a software program may be used for the calculation of those conditions of the deceleration control. However, it is noted that the hardware arrangement and the open-loop control of the deceleration of the CR motor 18 in the illustrated embodiments are advantageous for reducing a load on the CPU, and for accordingly increasing the printing speed of the printer. It is also to be understood that the principle of the present invention is equally applicale to the deceleration control of any type of DC motor used for various devices, machines and equipment other than printers.

It will be understood that the switching elements S1 and S4 function as forward motor driving means for applying a forward-drive electric current in the form of pulses to a DC motor during deceleration of the DC motor, to drive the DC motor in the forward direction, while the switching elements S2 and S3 function as plugging-braking means operable while the DC motor is subjected to a regenerative brake or operated in a non-braked state, for applying a reverse-drive electric current in the form of pulses to the DC motor, to apply a plugging brake to the DC motor, such that each pulse of the reverse-drive electric current is interposed between adjacent pulses of the forward-drive electric current, and such that the reverse-drive electric current flows in a direction corresponding to a reverse operating direction of the DC motor opposite to the forward operating direction. The switching elements S2 and S3 also function as dynamic braking means operable while the DC motor is subjected to a regenerative brake or operated in a non-braked state, for short-circuiting the DC motor to apply a dynamic brake to the DC motor, at each point of time between moments of generation of adjacent pulses of the forward-drive electric current. It will also be understood that the reversing-pulse-parameter register 50, delaying element 81, adder 83 and operator 85 cooperate to constitute pulse-width reducing means for gradually, more specifically, linearly reducing a pulse width of said forward-drive electric current.

What is claimed is:

1. A deceleration control apparatus for decelerating a DC motor, said apparatus comprising:

a plurality of control means including at least first control means and second control means;

said first control means supplying: (i) a forward-drive electric current of a first number of pulse or pulses for driving said DC motor in a forward operating direction, such that either a regenerative brake is applied to said DC motor or a non-braked state where said DC motor is not braked is established after each pulse of said forward-drive electric current; and (ii) a reverse-drive electric current of a second number of pulse or pulses for driving said DC motor in a reverse operating direction, after either said regenerative brake is applied or said non-braked state is established after the last one of said pulse or pulse of said forward-drive electric current;

after an operation of said first control means, said second control means supplying: (i) the forward-drive electric current of a third number of pulse or pulses, such that either a regenerative brake is applied to said DC motor or a non-braked state where said DC motor is not braked is established after each pulse of said forward-drive electric current; and (ii) a reverse-drive electric current of a fourth number of pulse or pulses for driving said DC motor in a reverse operating direction, after either said regenerative brake is applied or said non-braked state is established after the last one of said pulse or pulses of said forward-drive electric current; and said DC motor being decelerated as a whole during operations of said first control means and said second control means.

2. An apparatus according to claim 1, wherein each of said first and third numbers of pulse or pulses of said forward-drive electric current consists of one pulse of said forward-drive electric current, while each of said second and fourth numbers of pulse or pulses of said reverse-drive electric current consists of at least one pulse of said reverse-drive electric current.

3. An apparatus according to claim 1, wherein said first and third numbers of pulse or pulses of said forward-drive electric current consists of at least two pulses of said forward-drive electric current, while each of said second and fourth numbers of pulse or pulses of said reverse-drive electric current of said reverse-drive electric current consists of at least one pulse of said reverse-drive electric current.

4. An apparatus according to claim 1, wherein each of said second and fourth numbers of pulse or pulses of said reverse-drive electric current consists of one pulse of said reverse-drive electric current.

5. An apparatus according to claim 1, wherein each of said second and fourth numbers of pulse or pulses of said reverse-drive electric current consists of at least two pulses of said reverse-drive electric current.

6. An apparatus according to claim 1, wherein both of said first and third numbers of pulse or pulses of said forward-drive electric current consist of at least two pulses of said forward-drive electric current, while both of said second and fourth numbers of pulse or pulses of said reverse-drive electric current consist of at least two pulses of said reverse-drive electric current.

7. An apparatus according to claim 1, wherein said first number and said third number are the same.

8. An apparatus according to claim 1, wherein said second number and said fourth number are the same.

9. An apparatus according to claim 1, further comprising a period timer operable to detect a predetermined time interval at which supply of said first number or said third number of pulse or pulses of said forward-drive electric current to said DC motor is initiated.

10. An apparatus according to claim 1, wherein a pulse width of each of said second number and fourth number of pulse or pulses of said reverse-drive electric current has a predetermined proportional relationship with that of each of said first number and third number of pulse or pulses said forward-drive electric current.

11. An apparatus according to claim 1, further comprising pulse-width modulating means capable of (i) differentiating, when any one of said first through fourth numbers of pulse or pulses of said forward- or reverse-drive electric current consists of at least two pulses of said forward- or reverse-drive electric current, respective pulse widths of said at least two pulses of said forward- or reverse-drive electric current, (ii) differentiating a pulse width of any one pulse of said first number of pulse or pulses of said forward-drive electric current from a pulse width of any one pulse of said third number of pulse or pulses of said forward-drive electric current, and (iii) differentiating a pulse width of any one pulse of said second number of pulse or pulses of said reverse-drive electric current from a pulse width of any one pulse of said fourth number of pulse or pulses of said reverse-drive electric current.

12. An apparatus according to claim 1, wherein said first control means is operated to initiate supply of said reverse-drive electric current to said DC motor a first time after a moment of termination of supply of said forward-drive electric current by said first control means, and said second control means is operated to initiate the supply of said forward-drive electric current to the DC motor a second time after a moment of termination of the supply of said reverse-drive electric current by said first control means.

13. An apparatus according to claim 1, wherein said first number and said third number are different.

14. An apparatus according to claim 1, wherein said second number and said fourth number are different.

15. An apparatus according to claim 1, wherein it is possible to differentiate from one another respective time periods during each of which either said regenerative brake is applied to said DC motor or said non-braked state is established after the last pulse of said forward-drive electric current as supplied by said first and second control means.

16. An apparatus according to claim 1, wherein it is possible to differentiate from one another respective time periods during each of which said reverse-drive electric current is supplied to said DC motor by said first and second control means.

17. An apparatus according to claim 1, wherein said reverse-drive electric current is not supplied by at least one of a first one and a last one of said plurality of control means, during at least one corresponding period immediately after an initiation of the deceleration of said DC motor and immediately before a termination of the deceleration of said DC motor, respectively.

18. A deceleration control apparatus for decelerating a DC motor, said apparatus comprising:

at least first control means and second control means;

said first control means (i) supplying a forward-drive electric current of a first number of pulse or pulses for driving said DC motor in a forward operating direction, such that either a regenerative brake is applied to said DC motor or a non-braked state where said DC motor is not braked is established after each pulse of said forward-drive electric current; and (ii) permitting a dynamic-brake electric current of a second number of pulse or pulses to flow to short said DC motor to apply a dynamic brake to said DC motor, after either said regenerative brake is applied or said non-braked state is established after the last one of said pulse or pulses of said forward-drive electric current;

after an operation of said first control means, said second control means (i) supplying the forward-drive electric current of a third number of pulse or pulses, such that either a regenerative brake is applied to said DC motor or a non-braked state where said DC motor is not braked is established after each pulse of said forward-drive electric current; and (ii) permitting a dynamic-brake electric current of a fourth number of pulse or pulses to flow to short said DC motor to apply a dynamic brake to said DC motor, after either said regenerative brake is applied or said non-braked state is established after the last one of said pulse or pulses of said forward-drive electric current; and said DC motor being decelerated as a whole during operations of said first control means and said second control means.

19. An apparatus according to claim 18, wherein each of said first and third numbers of pulse or pulses of said forward-drive electric current consists of one pulse of said forward-drive electric current, while each of said second and fourth numbers of pulse or pulses of said dynamic-brake electric current consists of at least one pulse of said dynamic-brake electric current.

20. An apparatus according to claim 18, wherein said first and third numbers of pulse or pulses of said forward-drive electric current consists of at least two pulses of said forward-drive electric current consists of at least two pulses of said forward-drive electric current, while each of said second and fourth numbers of pulse or pulses of said reverse-drive electric current of said dynamic-brake electric current consists of at least one pulse of said dynamic-brake electric current.

21. An apparatus according to claim 18, wherein each of said second and fourth numbers of pulse or pulses of said dynamic-brake electric current consists of one pulse of said reverse-drive electric current.

22. An apparatus according to claim 18, wherein each of said second and fourth numbers of pulse or pulses of said dynamic-brake electric current consists of at least two pulses of said dynamic-brake electric current.

23. An apparatus according to claim 18, wherein both of said first and third numbers of pulse or pulses of said forward-drive electric current consist of at least two pulses of said forward-drive electric current, while both of said second and fourth numbers of pulse or pulses of said dynamic-brake electric current consist of at least two pulses of said dynamic-brake electric current.

24. An apparatus according to claim 18, wherein said first number and said third number are the same.

25. An apparatus according to claim 18, wherein said second number and said fourth number are the same.

26. An apparatus according to claim 18, further comprising a period timer operable to detect a predetermined time interval at which supply of said first number or said third number of pulse or pulses of said forward-drive electric current to said DC motor is initiated.

27. An apparatus according to claim 18, wherein a pulse width of each of said second number and fourth number of pulse or pulses of said dynamic-brake has a predetermined proportional relationship with that each of said first and third number of pulse or pulses of said forward-drive electric current.

28. An apparatus according to claim 18, further comprising pulse-width modulating means capable of (i) differentiating, when any one of said first through fourth numbers of pulse or pulses of said forward- or dynamic-brake electric current consists of at least two pulses of said forward- or dynamic-brake electric current, respective pulse widths of said at least two pulses of said forward- or dynamic-brake electric current, (ii) differentiating a pulse width of any one pulse of said first number of pulse or pulses of said forward-drive electric current from a pulse width of any one pulse of said third number of pulse or pulses of said forward-drive electric current, and (iii) differentiating a pulse width of any one pulse of said second number of pulse or pulses of said dynamic-brake electric current from a pulse width of any one pulse of said fourth number of pulse or pulses of said dynamic-brake electric current.

29. An apparatus according to claim 18, wherein said first control means is operated to initiate permitting said dynamic-brake electric current to flow a first time after a moment of termination of application of said forward-drive electric current by said first control means, and said second control means is operated to initiate the application of said forward-drive electric current to the DC motor a second time after a moment of termination of the permitting said dynamic-brake electric current to flow by said first control means.

30. An apparatus according to claim 18, wherein said first number and said third number are different.

31. An apparatus according to claim 18, wherein said second number and said fourth number are different.

32. An apparatus according to claim 18, wherein it is possible to differentiate from one another respective time periods during each of which either said regenerative brake is applied to said DC motor or said non-braked state is established after the last pulse of said forward-drive electric current as supplied by said first and second control means.

33. An apparatus according to claim 18, wherein it is possible to differentiate from one another respective time period during each of which said dynamic-brake electric current is permitted to flow by said first and second control means.

34. An apparatus according to claim 18, wherein said dynamic-brake electric current is not permitted to flow by at least one of a first one and a last one of said plurality of control means, during at least one corresponding period immediately after an initiation of the deceleration of said DC motor and immediately before a termination of the deceleration of said DC motor, respectively.

* * * * *

UNITED STATES PATENT AND TRADEMARK OFFICE
CERTIFICATE OF CORRECTION

PATENT NO. : 6,930,458 B2
DATED : August 16, 2005
INVENTOR(S) : Shigeki Akiyama and Masatoshi Kokubo It is certified that error appears in the above-identified patent and that said Letters Patent is hereby corrected as shown below:

Column 16,
Line 43, "pulse or pulse" should read -- pulse or pulses --.

Signed and Sealed this

Thirteenth Day of December, 2005

JON W. DUDAS
*Director of the United States Patent and Trademark Office*